US012574206B2

(12) United States Patent
Joye et al.

(10) Patent No.: US 12,574,206 B2
(45) Date of Patent: Mar. 10, 2026

(54) BLIND ROTATION FOR USE IN FULLY HOMOMORPHIC ENCRYPTION

(71) Applicant: ZAMA SAS, Paris (FR)

(72) Inventors: Marc Joye, Saint Zacharie (FR); Pascal Gilbert Yves Paillier, Paris (FR)

(73) Assignee: ZAMA SAS, Paris (FR)

( * ) Notice: Subject to any disclaimer, the term of this patent is extended or adjusted under 35 U.S.C. 154(b) by 119 days.

(21) Appl. No.: 18/558,900

(22) PCT Filed: Apr. 22, 2022

(86) PCT No.: PCT/EP2022/060745
§ 371 (c)(1),
(2) Date: Nov. 3, 2023

(87) PCT Pub. No.: WO2022/233605
PCT Pub. Date: Nov. 10, 2022

(65) Prior Publication Data
US 2024/0259180 A1      Aug. 1, 2024

(30) Foreign Application Priority Data

May 4, 2021      (EP) .................................... 21290025
Sep. 20, 2021      (EP) .................................... 21197775

(51) Int. Cl.
H04L 29/06        (2006.01)
H04L 9/00        (2022.01)
H04L 9/30        (2006.01)

(52) U.S. Cl.
CPC ............ H04L 9/008 (2013.01); H04L 9/3026 (2013.01)

(58) Field of Classification Search
CPC ..... H04L 9/008; H04L 9/3026; H04L 9/3066; H04L 9/3093
See application file for complete search history.

(56) References Cited

U.S. PATENT DOCUMENTS

2023/0188342 A1 *    6/2023    Su ......................... H04L 9/3093
                                                                      380/28

FOREIGN PATENT DOCUMENTS

WO        WO-2023110216 A1 *    6/2023    ........... H04L 9/3026

OTHER PUBLICATIONS

Boddeti, "Secure Face Matching Using Fully Homomorphic Encryption", 2018 IEEE 9th International Conference on Biometrics Theory, Applications and Systems (BTAS), Date of Conference: Oct. 22-25, 2018.*

(Continued)

*Primary Examiner* — Morshed Mehedi
(74) *Attorney, Agent, or Firm* — NIXON & VANDERHYE P.C.

(57)        ABSTRACT

Some embodiments are directed to a computer-implemented blind rotation method for use in fully homomorphic encryption (FHE). The method comprises rotating a polynomial (210) over a masked value and iterating over secret key digits, e.g., they may be ternary. The secret key digits can have at least three different values. An iteration further blind rotating the polynomial as indicated by a current secret key digit and a corresponding masking value. In the iteration an encrypted multiplier polynomial may be computed from bootstrapping keys and the masking values. One external product may be done in an iteration with the encrypted multiplier polynomial to further blind rotate the polynomial.

16 Claims, 5 Drawing Sheets

(56) References Cited

OTHER PUBLICATIONS

Naveed et al., "Dynamic Searchable Encryption via Blind Storage," 2014 IEEE Symposium on Security and Privacy, Berkeley, CA, USA, , pp. 639-654 (Year: 2014).*

Florian Bourse, et al., "Fast Homomorphic Evaluation of Deep Discretized Neural Networks", International Association for Cryptologic Research, Crypto 2018, LNCS 10993, pp. 483-512 (30 pages).

Jung Hee Cheon, et al., "A Hybrid of Dual and Meet-in-the-Middle Attack on Sparse and Ternary Secret LWE", IEEE Access, vol. 7, date of current version Jul. 23, 2019, pp. 89497-89506 (10 pages).

Ilaria Chillotti, et al., "TFHE: Fast Fully Homomorphic Encryption Over the Torus", Journal of Cryptology, vol. 33, No. 1, Apr. 25, 2019, pp. 34-91 (58 pages).

Ilaria Chillotti, et al., "Programmable Bootstrapping Enables Efficient Homomorphic Inference of Deep Neural Networks", vol. 20210127:133406, Jan. 25, 2021, 18 pages.

Craig Gentry, "Fully Homomorphic Encryption Using Ideal Lattices", Commun. ACM, vol. 53, No. 3, 2010, 10 pages.

Craig Gentry, "Computing Arbitrary Functions of Encrypted Data", Communications of the ACM, 2010, 8 pages.

Daniele Micciancio, et al., "Bootstrapping in FHEW-like Cryptosystems", Duality Technologies, Aug. 27, 2020, 25 pages.

Tanping Zhou, et ai., "Faster Bootstrapping With Multiple Addends", IEEE Access, vol. 6, date of current version September 28, 2018, pp. 49868-49876 (9 pages).

International Search Report and Written Opinion of the ISA for PCT/EP2022/060745 dated Jul. 29, 2022, 15 pages.

First JP Office Action, JP Application No. 2023-567181, Oct. 28, 2025.

Okada et al, "Integer-Wise Functional Bootstrapping on TFHE: Applications in Secure Integer Arithmetics," Information 2021, 12, 297. https://doi.org/10.3390/info12080297.

Ducas et al, "FHEW: Bootstrapping Homomorphic Encryption in less than a second," University of California, San Diego, CA, Retrieved from https://ia.rc2014/816, pp. 1-18, 2014.

* cited by examiner

BLIND ROTATION FOR USE IN FULLY HOMOMORPHIC ENCRYPTION

CROSS-REFERENCE TO RELATED APPLICATIONS

This application is the U.S. national phase of International Application No. PCT/EP2022/060745 filed Apr. 22, 2022 which designated the U.S. and claims priority to EP 21290025.2 filed May 4, 2021, and EP 21197775.6 filed Sep. 20, 2021, the entire contents of each of which are hereby incorporated by reference.

TECHNICAL FIELD

The presently disclosed subject matter relates to computer-implemented blind rotation method for use in fully homomorphic encryption, a computer readable medium, a computing system for fully homomorphic encryption.

BACKGROUND

Ever since Craig Gentry's breakthrough paper "Fully Homomorphic Encryption Using Ideal Lattices" (Full version in *Commun. ACM* 53(3):97-105, 2010; included herein by reference) there has been a continued effort to make Fully Homomorphic Encryption (FHE) sufficiently secure and efficient for real-world applications. An FHE allows one to perform computations, e.g., evaluate circuits, over encrypted data without being able to decrypt. For example, input data and computation result may be received and returned in encrypted form. Intermediate data, e.g., an internal state of the computation, may also be in encrypted form.

Even though the result of the computation is returned in an encrypted form, when decrypted the output is the same as if the operations had been performed on the unencrypted data. Homomorphic encryption can be used for privacy-preserving outsourced storage and computation. This allows data to be encrypted and out-sourced to a cloud environment for processing and/or storage, all while encrypted.

For example, homomorphic cryptography may be applied in fields such as health care in which privacy regulations may make it difficult to share plain data, but computations on encrypted medical data may be allowable. For example, a medical model developed, say, to classify medical data may be configured to receive medical data from a third party, say a hospital, in encrypted form. The medical model might, e.g., classify medical data, e.g., as normal or abnormal, or as having some particular medical syndrome, disease, or other disorder. Using homomorphic encryption, the medical model may be applied to medical data that is received in encrypted form. This means that the party that evaluates the medical model does not have access to the plain medical data that corresponds to the encrypted medical data. The user of the service can decrypt the result of the medical model application.

A cryptosystem that supports arbitrary computations on ciphertexts is known as a fully homomorphic encryption (FHE) scheme. Such a scheme enables the evaluation of a wide range of functions, and which can be run on encrypted inputs to produce an encryption of the result. For example, so-called functional completeness can be obtained once a combination of and-gates and or-gates are available as this allows one to implement any Boolean circuit. Such can be run by an untrusted party without revealing its inputs and internal state and output. A fully homomorphic encryption may be leveled, in which case the number of certain operations cannot exceed a predetermined threshold. A leveled fully homomorphic scheme may be converted to an unleveled FHE scheme by performing bootstrapping operations. A bootstrapping operation increases the number of operations than can be performed on an encrypted data item.

A fully homomorphic encryption scheme may support computations expressed in some special form, e.g., as a Boolean or arithmetic circuit. For example, a leveled fully homomorphic encryption scheme may support the evaluation of arbitrary circuits but of a bounded, pre-determined, depth. Unleveled fully homomorphic encryption (FHE) allows the evaluation of arbitrary circuits of unbounded depth. A leveled FHE scheme may be converted to an unleveled FHE scheme by periodic execution of a bootstrapping operation on data. It is known how to compile a computation, e.g., a function, in the form of a circuit.

Since Gentry's paper many FHE schemes have been developed, bringing computation times down with multiple orders of magnitude. Now, many FHE schemes are known. A more recent example of an FHE scheme is described in the paper "TFHE: Fast Fully Homomorphic Encryption over the Torus" by Ilaria Chillotti, et al. (J. Cryptology 33(1):34-91, 2020), included herein by reference A further FHE scheme is described in the paper "Programmable Bootstrapping Enables Efficient Homomorphic Inference of Deep Neural Networks" by Ilaria Chillotti, Marc Joye and Pascal Paillier, see Cryptology ePrint Archive: Report 2021/091, which is included herein by reference.

Nevertheless, there remains a need to further improve FHE schemes.

SUMMARY

The inventors noted that in existing FHE schemes the keys are typically expressed in bits. Increasing the number of possible values, e.g., going from bits to digits, e.g., by increasing a base radix from 2 to a higher number, say 3 or more, in a conventional setting would increase the computational workload of the FHE scheme considerably; in particular, the computational cost of bootstrapping operations will increase. For example, the number of so-called external products which may be used to perform bootstrapping operations, may increase. External products are a bottleneck for some important FHE operations, e.g., for bootstrapping operations; increasing their number is therefore undesirable.

An external product computes the multiplication between a multiplier and a multiplicand; e.g., torus elements or polynomials over the torus. Both multiplier and multiplicand are encrypted though typically with a different encryption scheme. The multiplicand may be one of the encrypted values of the FHE scheme, e.g., an intermediate value which may depend dynamically on input values of the FHE computation, a typical example is LWE encryption though other encryption schemes are possible. The multiplier is typically fixed before the FHE computation, and does not dynamically depend on input values of the FHE computation. The multiplier may be encrypted with an encryption scheme arranged to support multiplications, and which may differ from the scheme with which the multiplicand is encrypted. An FHE system, e.g., a computation system configured for computations encrypted according to an FHE scheme, may thus have access to the multiplier and multiplicand, though both in encrypted form, and be able to compute the multiplication while encrypted. The multiplication result if obtained by the FHE system in encrypted form, typically in an encryption type suitable for intermediate values, such as LWE. External multiplication is often done in polynomials, which means if numbers are to be multiplied, they may be lifted temporarily to polynomials, and converted back to numbers after the multiplication.

The inventors found how to increase the number of possible values of a secret key digit without having an increase in the number of external multiplications.

A computer-implemented blind rotation method is provided for use in fully homomorphic encryption. The method iterates over the secret key digits; however, each iteration comprises at most one external product. Interestingly, the number of external multiplications is at most the number of secret digits, regardless of the range of possible values each secret digit has. Secret digits which have 3 possible values need as many external multiplications as secret digits which have 4 or 5 possible values, etc. There are many more sequences of a given number of secret digits if the secret digits are allowed to have more possible values. In turn, this yields more freedom in the selection of the parameters so as to achieve a desired security level.

For example, an encrypted value may comprise a masked value and multiple masking values. In an iteration, an accumulator may be rotated in one direction over the masked value. This would give the correct rotation, if only the masked value was not masked. To correct for the masking, the accumulator may be rotated back in the opposite direction over an amount indicated by the secret digits and the masking values, e.g., their products. For example, for each pair of a secret digit and a masking value the accumulator may be rotated in the opposite direction as indicated by the combination of the secret digit and a masking value. Efficient implementations can combine more than one pairs of secret digit and masking values in a single opposite-direction rotation.

This can be achieved by computing a multiplier polynomial that indicates the desired amount of rotation in a given iteration. The multiplier polynomial relates to a secret key digit and is thus not accessible to the FHE system in plain form—it is computed in encrypted form. To emphasis the difference between the multiplier polynomial in encrypted form, that is in the form the system obtains it, and the multiplier polynomial that it encrypts the former will be denoted the encrypted multiplier polynomial, and the latter the plain multiplier polynomial. An encrypted multiplier polynomial may be denoted as $[\![ P(X) ]\!]$ .

One way of constructing the encrypted multiplier polynomial is to construct it from multiple possible plain multiplier polynomials, e.g., corresponding to the possible values of a secret key digit.

Interestingly, the inventors found that it is possible to compute such an encrypted multiplier polynomial without needing further external multiplications. Instead, the encrypted multiplier polynomial can be computed as an encryption of a linear combination of possible plain multiplier polynomials, the coefficients of the linear combination being encrypted in the form of bootstrapping keys. As bootstrapping keys are themselves encrypted, the resulting multiplier polynomial is encrypted yet still indicates the required amount of rotation. For example, the bootstrapping keys for a particular secret digit can be thought of as component-wise encryptions of a vector with at most one non-zero value (which is 1). Each bootstrapping key encrypts data that indicates whether a particular secret key digit has a particular value. The length of the vector may be less or equal to the number of possible values for the secret key digit.

The principles of the invention can be applied in any FHE scheme that relies on external multiplications to implement a bootstrapping operation and that allows the combining of (plain) polynomials and bootstrapping keys to obtain an encrypted multiplier polynomial.

A particularly useful application of blind rotations is in bootstrapping and/or function evaluation. By executing a blind rotation of a so-called test polynomial, the coefficient of the test polynomial that corresponds to a particular exponent can be looked-up, while encrypted. Such a blind rotation can be used for noise reduction and/or function evaluation. Function evaluation in turn can be used for a wide variety of applications, e.g., to implement other arithmetic operations, to implement node evaluation functions for a neural network and so on.

A further aspect is an electronic device, e.g., a computer, configured for blind rotation. The blind rotation method described herein may be applied in a wide range of practical applications. Such practical applications include the encrypted evaluation of software programs without having access to plain data. For example, one may evaluate medical diagnostic software on medical data without having actual access to said medical data nor medical results.

Medical data may comprise a medical image. A medical image may comprise, e.g., multi-dimensional image data, e.g., to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1*a* schematically shows an example of an embodiment of a system for performing a computation using fully homomorphic encryption (FHE), FIG. 1*b* schematically shows an example of an embodiment of a system for performing a computation using FHE, FIG. 1c schematically shows an example of an embodiment of a system for performing a computation using FHE, FIG. 2a schematically shows an example of an embodiment of a computing device, FIG. 2b schematically shows an example of an embodiment of a computing device, FIG. 3 schematically shows an example of an embodiment of an encrypted value, a secret key, and bootstrapping keys, FIG. 4 schematically shows an example of an embodiment of a rotation of a test polynomial, FIG. 5 schematically shows an example of an embodiment of a computing method, FIG. 6a schematically shows a computer readable medium having a writable part comprising a computer program according to an embodiment, FIG. 6b schematically shows a representation of a processor system according to an embodiment.

REFERENCE SIGNS LIST

Figures 1A, 1B, 1C:
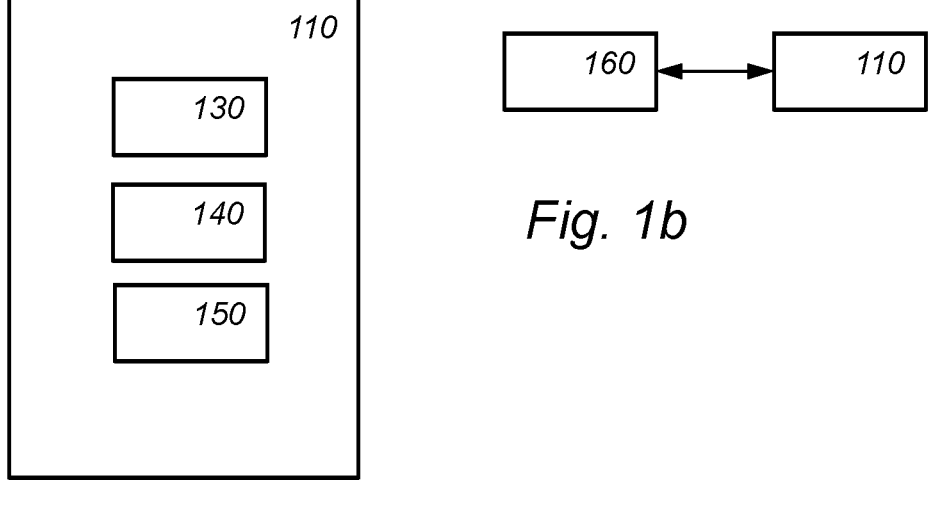

The following list of references and abbreviations is provided for facilitating the interpretation of the drawings and shall not be construed as limiting the claims. The list refers to FIGS. 1a-4.

110 an FHE computing system
111-113 an FHE computing system
130 a processor system
140 a storage
150 a communication interface
160 a data provider system
200 a computing system
210 a polynomial
221 an accumulator initiation unit
222 a multiplier polynomial unit
223 an accumulator updating unit
224 an external multiplier
231 an encrypted value
232 bootstrapping keys
233 encrypted multiplier polynomial
234 an accumulator
300 an encrypted value
360 multiple masking values
301-303 a masking value
304 a masked value
310 a secret key
311-313 a secret key digit
320, 330, 340 bootstrapping keys for a secret key digit
321-353 a bootstrapping key
350 possible values of a secret key digit
411 position of a coefficient before rotation
412 position of a coefficient after rotation
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

FIG. 1a schematically shows an example of an embodiment of an FHE computing system 110, e.g., a system for performing a computation using fully homomorphic encryption (FHE). For example, the system 110 of FIG. 1a may be used to perform a computation on data, even though said data is received in encrypted form, e.g., from a data provider.

System 110 may comprise a processor system 130, a storage 140, and a communication interface 150. Storage 140 may comprise local storage, e.g., a local hard drive or electronic memory. Storage 140 may comprise non-local storage, e.g., cloud storage. In the latter case, storage 140 may comprise a storage interface to the non-local storage. For example, storage 140 may store encrypted data items, e.g., received from one or more data providers or generated as intermediate results or end results, e.g., outputs, of the computation. Typically, most or all data items on which the computation of system 110 is performed are encrypted with a key (or keys) that is not known to system 110—that is system 110 may not be configured to obtain the plain data items corresponding to the encrypted data items, e.g., such as stored in storage 140. The decryption key in plain form is secret for system 110, though the encryption/decryption key may be available in encrypted form. For example, the processor system may be configured to perform a sequence of FHE operations, which may include such arithmetic operations on encrypted values as addition and multiplication, but may also include arithmetic operations on encrypted polynomials. FHE operations may also include such operations as a blind rotation of a polynomial, a bootstrapping, and the like. Rotation of a polynomial shifts the coefficients of the monomials in a polynomial to the next exponent. For example, a polynomial $f(x) \bmod (x^n+1)$, is rotated over $\alpha$ positions by computing $x^\alpha f(x) \bmod (x^n+1)$, or if rotation in the other direction is desired by $x^{-\alpha} f(x) \bmod (x^n+1)$. Blind rotation computes the same procedure on a polynomial, except under cover of encryption. Apart from its interest as a cryptographic operation in its own right, blind rotation also has important applications in FHE, in particular as a building block for bootstrapping operations with or without function evaluation.

System 110 may communicate internally, with other systems, external storage, input devices, output devices, and/or one or more sensors over a computer network. The computer network may be an internet, an intranet, a LAN, a WLAN, etc. The computer network may be the Internet. The system comprises a connection interface which is arranged to communicate within the system or outside the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna. Communication, e.g., internal communication, may use other communication protocols or media, e.g., an internal data bus.

In system 110, the communication interface 150 may be used to send or receive digital data. For example, system 110 may be configured to receive encrypted data items from an external computer, e.g., a data providing computer. For example, system 110 may be configured to transmit computation results to an external computer, typically, in an encrypted format. For example, communication interface 150 may be used for internal communication in system 110, e.g., to distribute the computation of multiple computation entities, e.g., computing devices.

The execution of system 110 may be implemented in a processor system, e.g., one or more processor circuits, e.g., microprocessors, examples of which are shown herein. System 110 may comprise multiple processors, which may be distributed over different locations. For example, system 110 may use cloud computing.

Some of the figures show functional units that may be functional units of the processor system. For example, a figure may be used as a blueprint of a possible functional organization of the processor system. The processor circuit(s) are not shown separate from the units in most figures. For example, the functional units shown in FIG. 2 (see below) may be wholly or partially implemented in computer instructions that are stored at a system such as system 110, e.g., in an electronic memory of system 110, and are executable by a microprocessor of system 110. In hybrid embodiments, functional units are implemented partially in hardware, e.g., as coprocessors, e.g., arithmetic and/or cryptographic coprocessors, and partially in software stored and executed on system 110.

FIG. 1b schematically shows an example of an embodiment of a system for performing a computation using FHE. FIG. 1b shows the FHE system of FIG. 1a in the context of a data provider system 160. FHE system 110 is configured for performing a computation using fully homomorphic encryption (FHE).

For example, system 110 may be configured to receive encrypted data items from a data provider 160. At least some data items may be received in encrypted form. Some data items may be received in plain format. The computation is run on the received data items and possibly also on stored data items. Interestingly, the computation may be performed on the encrypted data, without decrypting the data, e.g., without converting encrypted data items to data in a plain format.

System 110 may be configured for an FHE scheme, e.g., for a number of FHE operations. FHE operations may include gates. For example, an FHE system may be configured for a so-called NAND-gate. For example, an FHE system may have an addition and a multiplication operation, e.g., in a finite field, or finite ring, or the like. The operations of the FHE scheme are in principle sufficient to perform a wide range of computations, with the exception that the size of the computation may be limited, e.g., if the FHE scheme is a leveled scheme without a bootstrapping operation, or without a bootstrapping operation being employed.

Typically, encrypted data in an FHE scheme and as implemented in an FHE system, involves some measure of noise. For example, encryption of a data item may comprise mapping the data item to a point in a key-dependent lattice, to which some noise is added.

When a data item has just been encrypted the noise is low—the encryption is fresh. For example, the amount of noise is so low, that if a data item were to be decrypted, the noise can be removed at some point in the decryption process, e.g., by rounding. On the other hand, the noise should be high enough to make attacks on the system sufficiently hard. For example, in the hypothetical absence of noise, many FHE schemes could be attacked with linear algebra, or other efficient algorithms, e.g., lattice-based algorithms. When a data item is encrypted, noise is added that is chosen so that attacks are hard while FHE operations can still be performed. Most FHE operations will increase the noise that is inherent in an encrypted FHE data item. When many such operations are performed, the noise will reach a level such that correct decryption is no longer possible. At that point, the scheme breaks down. Generally speaking, two approaches have been developed in the art to deal with this phenomenon. The first is a leveled FHE scheme. A leveled FHE scheme can perform some number of operations, one after the other. The leveled FHE scheme is designed such that the worst-case noise at the end of such a number of operations is below a bound needed for decryption. Another approach are so-called bootstrapping operations. A bootstrapping operation reduces noise in an encrypted data item. A bootstrapping operation is possible if the FHE scheme is capable enough to evaluate homomorphically the decryption algorithm in the encrypted domain—sometimes called a bootstrappable FHE scheme. For example, a bootstrapping operation receives helper data related to the encryption key that allows reducing the noise without decryption of the encrypted data items. Typically, the helper data is an encrypted version of the key used to decrypt the data item. Note that the decryption key may be the same as the encryption key, in case of a symmetric-key FHE scheme, or may be distinct therefrom, e.g., in case of an asymmetric-key FHE scheme. In addition to encryption and decryption keys, an FHE scheme may use other keys, such as a key for homomorphic evaluation. The latter is typically a public key corresponding to a private key which may be stored at the data provider.

Although the bootstrapping operation performs the decryption of an encrypted data item, counterintuitively the decryption is performed in an encrypted domain, so that the homomorphic decryption does not actually reveal anything about the plain data item. The bootstrapping operation then performs the noise reduction-typically by homomorphic rounding. The result is an encrypted data item, with a lower, fixed noise level. Typically, the noise present in the ciphertext resulting from bootstrapping results from the bootstrapping operation. One element of a bootstrapping operation can be a blind rotation.

After the bootstrapping, a new sequence of FHE operations can be performed until the noise level becomes so high, that a new bootstrapping operation is needed.

Determining when a bootstrapping is needed can be done by keeping track how large the noise level will be, e.g., assuming a worst-case scenario. Instead of a worst-case scenario, an average-case may be assumed, although this may increase the risk of a computation result which cannot be decrypted. For example, a computation that is inherently robust against occasional errors, such as a neural network evaluation, may be performed using average-case analysis for the noise propagation.

The noise analysis, e.g., worst-case or average-case analysis, may be done beforehand, but may also be done dynamically. The noise-increase may depend on the particular computation. For example, an FHE scalar multiplication increases noise by an amount that depends on the multiplicand. One approach is to perform a bootstrapping operation often, e.g., after every operation, or after every set number of operations, e.g., every two.

FHE schemes can be applied in many settings. For example, FHE system 110 may be operated by a cloud provider. The cloud provider may offer computation and storage services to its clients. By employing FHE encryption, data provider 160, e.g., a client of the cloud provider can send their data in encrypted form. The cloud provider can still perform the required computations, and/or the required storage, but will not be able to know the corresponding to plain data nor the result of the computation. For example, data provider 160 may use an encryption key of a type corresponding to the particular FHE scheme used in the FHE system, to encrypt the data items. When computations results are received by data provider 160 from FHE system 110, a corresponding decryption key may be used to decrypt the encrypted data items. Encryption and decryption keys may be the same—and typically are so.

For example, system 110 may be configured to train machine-learning models, e.g., image classifiers, e.g., medical models, without having access to the plain data items. For example, linear regression may be performed on the input data, possibly, even without bootstrapping. For example, backpropagation may be performed on the input data, possibly, with bootstrapping. The resulting model parameters may be returned to an entity who is in possession of the decryption key. This enables multiple providers of medical data to pool their data, by sending the data to a cloud provider. The cloud provider then returns the model parameters, without ever having access to the plain data.

After the model is trained, the FHE system 110 may be used to offer the model, say, for use with medical data. This can be done with plain model parameters or encrypted model parameters—in both cases with encrypted data, e.g., encrypted input, intermediate and output data. Using plain model parameters, is usually much more efficient. In both cases, an effect of the system is that a computation is performed, say an image classification, e.g., a medical image classification, without the computer knowing the plain data items. For example, a mammogram may be evaluated for cancer, without the image ever being in the plain at system 110 and without system 110 knowing what the outcome of the cancer evaluation is. From a privacy point of view it may be acceptable to operate a plain model on encrypted privacy sensitive data, while it might not be acceptable to operate on plain privacy sensitive data.

Other applications involve, database services, e.g., looking up encrypted data in an encrypted database; for example, the computation may be a comparison between an input item and a database item. For example, multiple computations may be combined to produce a database index that matches an index. For example, the database, may be a genomic database, and the input a gene sequence. For example, system 110 may be used for protected control of a device. For example, a device, even a large device such as a power plant, may send sensor values to system 110 and receive encrypted control signals in return; the control signals being computed from the sensor signals. An attacker of the system may be able to determine the contents of data going to and from system 110, or even gain access to intermediate data of system 110, but he will not be helped by that as the data is encrypted. Even a full break of system 110 will not reveal the data, as the decryption key is not known to system 110. Computing the control signal may involve such mathematical operation as linear algebra, averages, matrix multiplication, polynomial evaluations, and so on, all of which are possible to execute with FHE operations.

For example, a pool of encrypted data items may be maintained in the FHE system; some of these may be received some may be the result of an FHE computation, e.g., intermediate results. For example, the FHE system may be configured to apply an FHE operation to one, two or more encrypted data items in a pool, e.g., a collection of input and/or intermediate and/or output values. The result will be a new encrypted data item that may be stored in the pool. The pool may be stored in a storage of the FHE system. This may be local storage or a distributed storage. In the latter case, it may happen that one or more encrypted data items are represented multiple times in the pool. Encrypted data items may be sent from one computing device to another, e.g., if their values are needed elsewhere. The pool may be implemented in various ways, e.g., as a register file, an array, various data structure, and so on.

For example, in an FHE scheme based on the Learning With Errors (LWE) problem, e.g., such as the Torus-FHE (TFHE) scheme mentioned in the background, an encryption key may be a string of n digits $s_i$, a cipher text may be a tuple $(a_1, \ldots, a_n, b)$ with $b - \sum_{j=1}^{n} s^j \cdot a_j = \mu + e$. In the latter, + and · respectively represents the addition between torus elements and a product between integers and torus elements, $a_i$ are n numbers, $\mu$ is the plain data item, and e is the noise, e.g., drawn from a probability distribution, e.g., a Gaussian distribution. The torus may refer, e.g., to the set of real numbers modulo 1, or to the set of integers modulo q divided by q for some integer q. Conventionally, the secret digits $s_1, \ldots, s_n$ of the secret key s are bits. The inventors realized that it would be advantageous to extend this to secret digits $s_j$ which can take on more than 2 values, e.g., three values (ternary digits), four values, or even more.

This scheme naturally extends to other mathematical structures, including based on polynomials. The numbers $s_i$, $a_i$, b, u, e may therefore be taken from a different mathematical structure. Not all encrypted data items need to be encrypted under the same key, and in fact re-encryptions with a different key is a possible FHE operation. To convert from one key to another a so-called key-switching procedure may be used, which may use so-called key-switching keys. Key-switching keys provided information how elements encrypted under a first key can be re-encrypted under a second key, without revealing either key.

The encrypted data items may represent all kinds of data. For example, encrypted data items may represent numbers that need to be averaged, or which are used for linear regression, etc. For example, the encrypted data items may represent an image. For example, each pixel of the image may correspond to one or more encrypted data items. For example, a grey-scale pixel may be represented by a grey level, which in turn may be represented by a single encrypted data item. For example, 256 grey levels may be encoded in a single encrypted data item. For example, a color pixel may be represented as multiple color levels, e.g., RGB levels, which in turn may be represented by a tuple of encrypted data items. For example, three 256-level colors may be encoded in three encrypted data items. How many encrypted data items are used to represent some type of data depends on the capacity of the FHE scheme. For example, more restrictive FHE schemes may only be capable of encoding one bit per encrypted data item. In that case, one color pixel, may require 24 encrypted data items.

Although without access to the decryption key it may not be possible to say exactly how large the noise is, one can typically bound the noise, e.g., as the initial noise level is known for a fresh encryption and the noise increase for various operations are known. Noise increase may depend on the type of operation, e.g., addition versus multiplication, and on the other parameters if any. For example, an FHE operation may be multiplication with a known, e.g., plain value, e.g., multiplication by 2, multiplication with a known polynomial, and so on. For example, multiplication with a larger value may increase the noise more than multiplication with a smaller value. Exactly how much noise increases given the operations performed can be calculated mathematically, or could be estimated empirically. While some operations may add significant amounts of noise, others may not add noise, e.g., an addition with a plain constant.

A set of FHE operations may be defined for the computation. For example, from a target FHE computation, a network or circuit of operations may be built that together implement the computation. For example, the operations may be Boolean operations. For example, the operations may all be NAND operations. The way the FHE operations are combined, e.g., which operation is applied to which operand in pool determines the computation that is being performed. For example, the computation may be represented as a list of FHE operations that are to be performed together with an indication on which FHE encrypted data item they are to be performed.

As operations are performed, the noise associated with the new computed (not-fresh) encrypted data items may grow. This is not a problem so long the noise stays within a limit needed for decryption. If more operations are to be performed, a bootstrapping operation can be performed.

The size of encrypted data items in an FHE scheme can be quite large. Moreover, the more operations an FHE scheme is to perform without a bootstrapping operation the larger the size of an encrypted data item typically will be. Likewise, a higher resistance against attacks may be obtained with larger FHE parameters and in turn with larger encrypted data items. For example, the data items may be mapped to an FHE system featuring larger FHE parameters, so that more noise can be added while still being able to successfully perform operations. Increasing the range of values that a secret key digit can take on, will increase the entropy, and thus contribute to the FHE security.

FIG. 1c schematically shows an example of an embodiment of a system for performing a computation using FHE. Shown in FIG. 1c is the data provider system 160, and three FHE devices: Devices 111, 112, and 113. Each of devices 111, 112, and 113 are capable of performing FHE operations on encrypted data items. Together the three devices form the FHE system. There may be two or more than three FHE devices cooperating to form an FHE system.

In the case of FIG. 1c, the computation is distributed over multiple FHE devices, in the example shown, three FHE devices. For example, one of the multiple FHE devices may transmit encrypted data items to one or more of the other multiple FHE devices, e.g., received encrypted data items or intermediate encrypted data items, e.g., partial computation results. Likewise, each of the multiple FHE devices may be configured to receive encrypted data items from the other devices.

Blind rotation may be used in a fully homomorphic encryption (FHE) system and may operate on encrypted values such as received or computed in an FHE system. The encrypted values comprise both masking values and a masked value. While working on these numbers, the system may discretize these numbers. Discretized numbers are indicated with a tilde. Discretizing is typically done since usually $q>2N$; this may be also needed when working on numbers that are not integers. Discretizing is not necessary though; for example, if $q \leq 2N$ and numbers are integers no discretizing is needed. The masked value is almost equal to a plain value and a mask, however also some noise is typically added. The secret key s is not available in plain to the FHE system, however, to reduce noise the secret key s is available in the form of multiple bootstrapping keys. The bootstrapping keys are an encryption of multiple data items that together represent the secret key digits. Some operations, such a blind rotating or bootstrapping can use the encrypted secret key in the form of bootstrapping key to perform computation on encrypted data.

A polynomial may be blind rotated in two phases: a first phase comprising rotating over the masked value, this could be done in plain, and a second phase comprising compensating for the rotation over the masking value. The latter rotation is done while encrypted and depends on the secret key digits represented by the bootstrapping keys and the masking values. In one iteration over the secret key digits, each secret key digit and corresponding masking value is processed. Each secret key digit needs only one external multiplication. To process one or more secret key digits using a single external multiplication, first an encrypted multiplier polynomial may be constructed. The corresponding plain multiplier polynomial comprises at least a monomial ($X^d$) the exponent of which indicates the amount of further rotation. The encrypted multiplier polynomial is then used in an external multiplication.

There may be further monomials in the polynomial, which may either be used for further features, e.g., to reduce the number of bootstrapping keys, and/or which may be compensated for in the algorithm to update an accumulator. Preferred plain multiplier polynomials are of the form $X^d - X^e$, $X^d - 1$ or $X^d$, though other polynomials could be accommodated. For example, the encrypted multiplier polynomial may be computed as a dot product of a sequence of bootstrapping keys for a particular secret key digit and a sequence of plain polynomials for the multiple possible values (A(i)) of the current secret key digit. For example, the possible plain multiplier polynomials may be (($X^{A(i)\tilde{a}_j} - 1$); ($X^{A(i)\tilde{a}_j} - X^{A(0)\tilde{a}_j}$); $X^{A(i)\tilde{a}_j}$). For example, the encrypted multiplier polynomial may be computed as $$\left(\left(X^{a_j} - 1\right)bsk[2j-1] + \left(X^{-a_j} - 1\right)bsk[2j]\right), \text{ or}$$

$$\left(\sum\nolimits_{i=1}^{m-1}\left(X^{A(i)a_j} - 1\right)bsk[(m-1)(j-1) + i]\right), \text{ or}$$

$$\left(\sum_{\substack{0 \leq i_1, \ldots, i_d \leq m-1 \\ (i_1, \ldots, i_d) \neq (0, \ldots, 0)}} \left(X^{\sum_{l=1}^{d} A(i_l)\tilde{a}_{(h-1)d+l}} - 1\right)\right.$$

$$\left. bsk\left[(m^d - 1)(h-1) + \sum\nolimits_{l=1}^{d} i_l m^{l-1}\right]\right), \text{ or}$$

$$\left(\sum_{\substack{0 \leq i_1, \ldots, i_d \leq m-1 \\ (i_1, \ldots, i_d) \neq (0, \ldots, 0)}} \left(X^{\sum_{l=1}^{d} A(i_l)\tilde{a}_{(h-1)d+l}} - X^{A(0)\sum_{l=1}^{d} \tilde{a}_{(h-1)d+l}}\right)\right.$$

$$\left. bsk\left[(m^d - 1)(h-1) + \sum\nolimits_{l=1}^{d} i_l m^{l-1}\right]\right).$$

The encrypted multiplier polynomial is externally multiplied with the accumulator. In the above formula, $\tilde{a}_j$ represents a masking value, bsk[ ] a bootstrapping key, A(i) a possible value of the secret digit. These formulas refer to discretized values although this is not necessary.

Efficient choices for the encryptions used may be LWE or GLWE encryption for values, and/or GGSW encryption for the encrypted multiplier polynomial and/or for the bootstrapping keys are a GGSW encryption, and/or GLWE encryption for the blind rotated polynomial. For example, a plain multiplier polynomial $P_j$ may be $(X^{s_j a_j}-1)$, the corresponding encrypted multiplier polynomial may be encrypted, e.g., with GGSW, and may be denoted as $[\![P_j]\!]$. An encrypted multiplier polynomial is an encryption of the multiplier polynomial. It is not required to have access to the plain multiplier polynomial to compute the encrypted multiplier polynomial. Note that in GGSW the encrypted multiplier polynomial may be a matrix.

It is noted however, that other choices for the encryption schemes could be used if they support external multiplication. Interestingly, only one external product per secret key digit is needed, regardless of the number of possible values of a secret key digit.

Figure 2A:
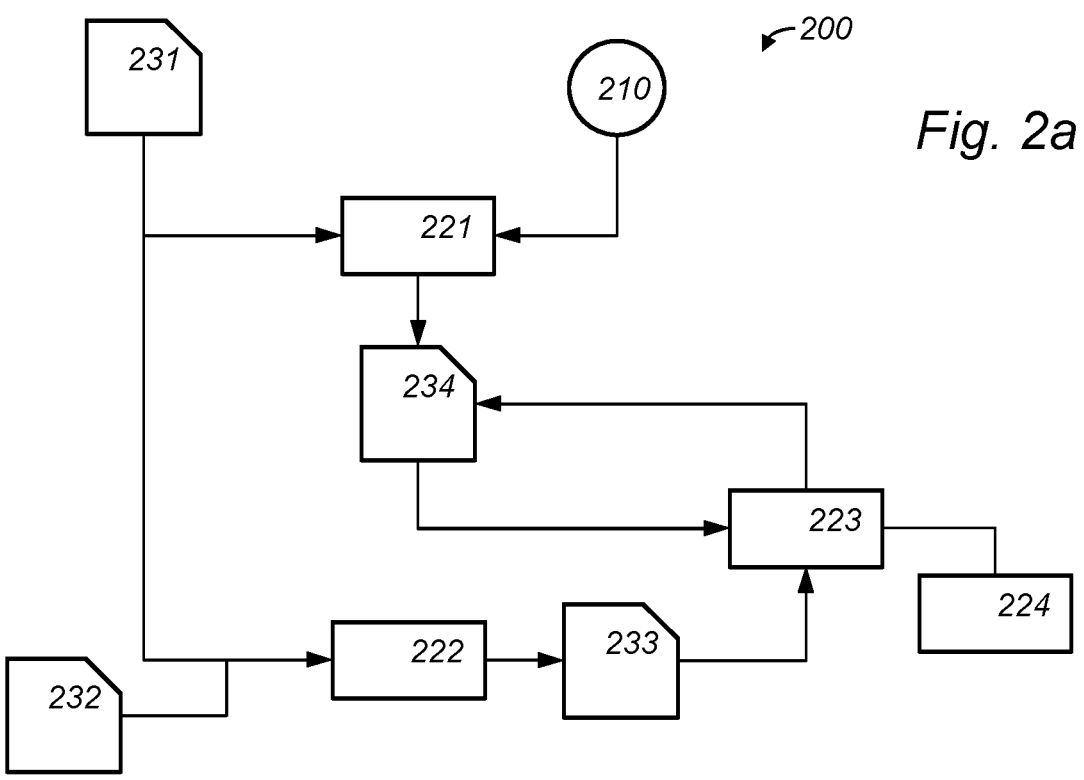

FIG. 2a schematically shows an example of an embodiment of a computing system 200. For example, the computing system 200 may be, or implemented on, FHE computing system 110, or on FHE computing system 111-113, etc. System 200 has access to encrypted values, one of which is shown as encrypted value 231. For example, the encrypted value may be received over a communication interface and/or may be stored in a storage of system 200. The encrypted values represent some plain value encrypted with a key s. However, typically system 200 does not have access to key s.

System 200 also has access to a polynomial 210, e.g., received and/or stored at system 200. Polynomial 210 may be a plain polynomial, and is to be blind rotated. The extent of the rotation is indicated by the encrypted value 231. Although polynomial 210 may be plain, after the blind rotation procedure the rotation result will be encrypted under a key unknown to system 200, i.e., the rotation is blind to system 200. Polynomial 210 could also be an encrypted polynomial, but for many applications this is not necessary.

The encrypted value 231 comprises a sequence of masking values ($a_i$) and a masked value (b). There is a relationship between the masked value (b) and the plain value that it represents. The masked value can be computed from a mask and the plain value and the addition of noise. For example, the mask may be computable from a secret key (s) and the sequence of masking values. The secret key (s) comprising a sequence of secret key digits ($s_i$). The secret digits may be ternary digits, e.g., having possible values of $-1$, 0, or 1, or they could be decimal digits, e.g., having possible values of 0, 1, 2, 3, . . . , 9, etc. The random noise may initially be drawn from a noise distribution, e.g., Gaussian noise, e.g., when a fresh encryption is performed. When new encrypted values are computed as a result of computation on previous values, the noise of the new values typically depends on the noise in the input values of the computation and the nature of computation, e.g., multiplications tend to increase noise more than additions. The noise may also change due to bootstrapping operations, in which case the noise may decrease. There is a desire to keep the amount of noise within a decryption bound within which values can still be correctly decrypted.

System 200 also has access to multiple bootstrapping keys that correspond to each secret key digit, the multiple bootstrapping keys being an encryption of multiple data items representing the secret key digit. Like the encrypted values, also encryption of the bootstrapping keys is not known to system 200. Typically, the bootstrapping keys are encrypted under a different key than the encrypted values, e.g., a key s and a key s' respectively.

FIG. 2a shows a procedure for blind rotation that uses an operation called an external multiplication of ciphertexts.

While multiplication of two encrypted values is often difficult, it may be, relatively speaking, easier to multiply an encrypted value with a predetermined value, encrypted in a manner to facilitate multiplication.

The structure of the encrypted values can be exploited to perform the blind rotation. An accumulator may be initialized with polynomial 210 rotated over the masked value in encrypted value 231. An accumulator initiation unit may be configured to perform this task. This part of the rotation is blind by virtue that the masked value is blind, e.g., corresponds to a plain value unknown to system 200. The accumulator is now rotated in the other direction with the masking value, to leave the blind rotated polynomials. The latter may be done by rotating over amounts indicated by the masking values and the secret digits. Typically, this amount is the product of the masking value and the corresponding secret key digit.

The masking values are known to system 200, the secret digits are known in encrypted form as bootstrapping keys 232. A multiplier polynomial unit uses the masking values and the bootstrapping keys 232 to produce an encrypted multiplier polynomial. The encrypted multiplier polynomial is used to cause a rotation over the amount indicated by the masking value and the secret digits. Interestingly, the encrypted multiplier polynomial is computed in an encryption domain that allows computation of the multiplier polynomial while encrypted. For example, such an encryption domain might support addition and multiplication of a plain polynomial and an encrypted polynomial. As the bootstrapping keys are encryptions of polynomials of degree 0, this in effect allows the construction of an encrypted multiplier polynomial that represents the rotation. For example, the encrypted multiplier polynomial $[\![P]\!]$ may be computed by a multiplier polynomial unit. For example, the encrypted multiplier polynomial $[\![P]\!]$ may be an encryption of a polynomial P of the form $X^{a_j s_j}-1$ or the form $X^{a_j s_j}$, wherein $a_j$ is the masking value corresponding to secret digit $s_j$. To rotate the accumulator, one may compute, e.g., $Acc+(X^{a_j s_j}-1)Acc$ or $(X^{a_j s_j})Acc$ under cover of encryption; this operation may be done in an accumulator updating unit 233. Constructing the encrypted multiplier polynomial $[\![P]\!]$ may be done by computing the plain multiplier polynomial for all possible values of the secret key digit, and using the bootstrapping key to select the correct one and produce it encrypted form. For example, if a bootstrapping key bsk is an encryption of $s_j$ with $s_j$ 0 or 1, then $(X^{a_j}-1)$bsk is an encryption of 0 or $X^{a_j}-1$, adding such terms for all bootstrapping keys one may obtain the encrypted multiplier polynomial. The accumulator updating unit 233 may use an external multiplier unit 224 configured to compute an external multiplication between the multiplier polynomial and the accumulator.

In system 200 various encrypted objects occur, e.g., encrypted values, such as value 231, bootstrapping keys 232, accumulator 234, multiplier polynomial 233, and so on. Although these could all be encrypted under the same secret key, e.g., a key known to a client of system 200, e.g., a data provider system 160, it may be easier to use different encryption schemes and different keys to optimize the various steps. An example of such a system is provided below in FIG. 2b.

For example, embodiments may be implemented in the context of FHE scheme described in the paper "Programmable Bootstrapping Enables Efficient Homomorphic Inference of Deep Neural Networks" by Ilaria Chillotti, Marc Joye and Pascal Paillier, see Cryptology ePrint Archive:

Report 2021/091. This reference uses secret key digits that can only assume two values; using embodiments herein the described scheme may be implemented using secret key digits that can assume more than two values without increasing the number of external multiplications.

Figure 3:
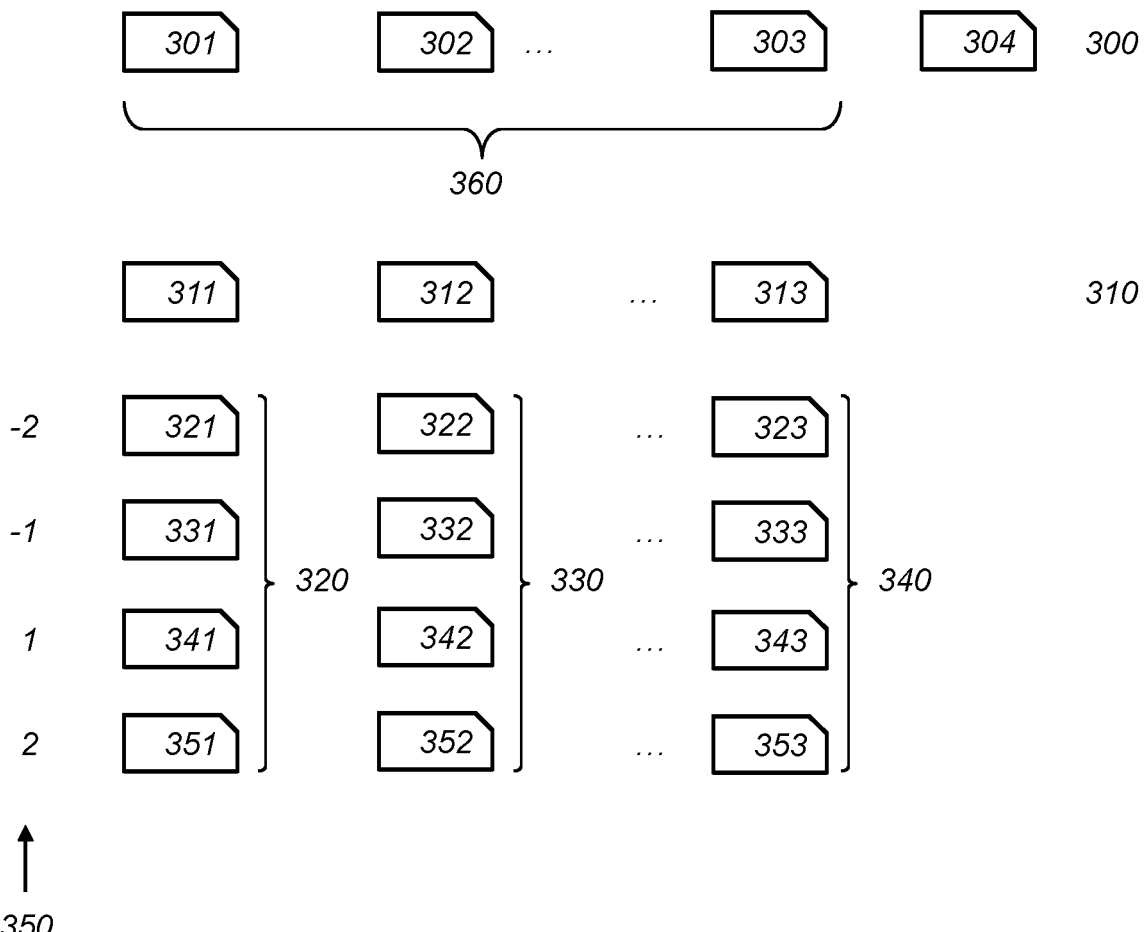

FIG. 3 illustrates an embodiment of an encrypted value 300, the secret key 310 and the bootstrapping keys 321-353. This example may be used, e.g., in system 200 or in system 201 for bootstrapping keys 232. The encrypted value 300 comprises a sequence of masking values 360 and a masked value 304; shown are masking values 301-303. The secret key 310 comprises a sequence of secret digits; shown are secret digits 311-313. A mask can be computed from the secret key and the sequence of masking values. For example, the mask may be the dot product of the sequence of secret digits and the masking values. The mask may be added (or subtracted) to a plain value. In addition to the mask also some noise will be added (or subtracted) to avoid a linear relationship. Typically, these and other values will be computed in a finite ring or field. If polynomials are used, they may in addition be modulo a polynomial, e.g., $X^N+1$, or the like.

The secret digits 311-313 can assume more than two values. In the example illustrated in FIG. 3, the secret digits can have the values −2, −1, 0, 1, and 2. Any other list of possible values can be supported. The list does not have to be consecutive. For each combination of a possible value and a secret key digit a bootstrapping key may be computed. According to an optimization no bootstrapping keys are needed to encode one particular value—typically chosen to be the zero value. For example, a bootstrapping key may encrypt a binary value that indicates whether or not the corresponding secret key digit has the corresponding possible value. For example, bootstrapping key 321 may be an encryption of '1' if secret key digit 311 has the value '−2', and of '0' if not; bootstrapping key 331 may be an encryption of '−1' if secret key digit 311 has the value '−1', and of '0' if not; bootstrapping key 341 may be an encryption of '1' if secret key digit 311 has the value '1', and of '0' if not; bootstrapping key 351 may be an encryption of '2' if secret key digit 311 has the value '2', and of '0' if not. If none of the bootstrapping keys 321-351 are an encryption of '1', e.g., they are all an encryption of '0', then the secret key digit 311 has the value zero (instead of zero, any other value could be used, but zero is convenient). The other secret key digits likewise may have corresponding bootstrapping keys that encode the value of the corresponding secret key digit, again in encrypted form. Thus, one can use (n−1) data items, e.g., bits to encode n possible values for a secret digit—exploiting that one possible value can be encoded by virtue of the fact that if all other possible values are used, that the single value left must be the one encoded. This spares one bootstrapping key, but this optimization is not necessary. For example, one may use n data items, e.g., bits to encode n possible values for a secret digit, e.g., one bit for every possible value.

For example, the bootstrapping keys for a particular secret key digit may encrypt binary values, e.g., bits, indicating whether the secret key digit ($s_j$) has a value corresponding to the bootstrapping key. For example, a bootstrapping key $bsk_j(i)$ for secret key digit $s_j$ may encrypt a 0 or 1 depending on whether $s_j$ is equal to the i-th possible value, e.g., is equal to A(i). Using bits, a preferred way of encoding one possible value, encode a 0 for all other values. In this way, the number of bootstrapping keys for a secret key digit is one less than the number of possible values of the secret key digits, while still allowing efficient computation of encrypted multiplier polynomials. For example, the bootstrapping keys may encode for a zero value by not indicating any other value for the secret key digit. For example, one, e.g., a client, may compute the bootstrapping key using the following pseudo code:

```
For i = 0 to m-1
    If (s_j = A(i)) then bsk_j(i) := GGSW ('1')
        Else bsk_j(i) := GGSW (0)
    Endif
Endfor
```

In the above code $bsk_j(0)$, . . . , $bsk_j(m−1)$ are the bootstrapping keys for secret key digit $s_j$. A( ) denotes the possible values of a secret key digit, and m the number of possible values. Note that this uses as many bootstrapping keys are there are possible value, which is not preferred—for example one might skip $bsk_j(0)$. An alternative notation for the bootstrapping key is to arrange them in a single array, e.g., bsk [ ]

Figure 2B:
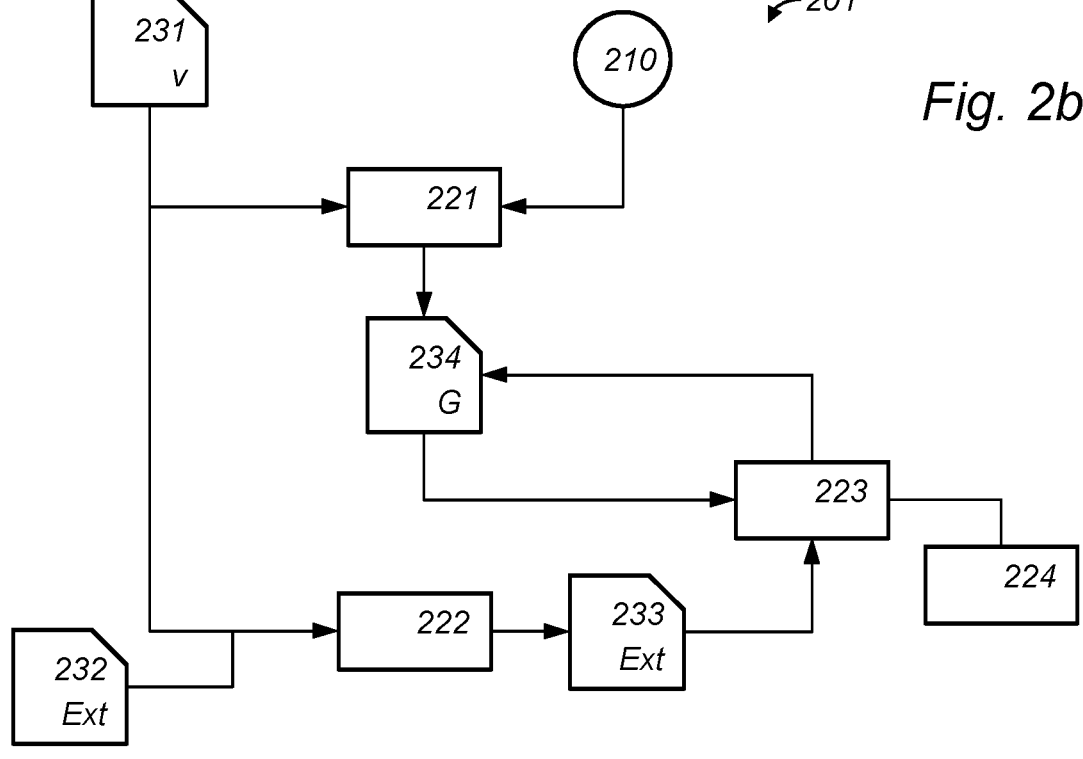

FIG. 2*b* schematically shows an example of an embodiment of a computing system 201. For example, the computing system 201 may be, or implemented on, FHE computing system 110, or on FHE computing system 111-113, etc. System 201 is similar to system 200, except that some specific choices are suggested for implementing the system. System 201 is configured to perform a blind rotation, e.g., a rotation of a polynomial while in encrypted form. In particular, system 201 may be configured for fully homomorphic encryption (FHE). For example, system 201 may store FHE operations that are to be performed on encrypted values, at least some of which may be received from outside system 201, e.g., from a device 160. For example, system 201 may comprise a communication device configured for receiving encrypted values. On such encrypted value is shown in FIG. 2*b*, as encrypted value 231. System 201 may employ different types of encryption. The encrypted values 231 is marked with a 'v' for value. The encrypted value may be encrypted as encrypted value 300. For example, encrypted value 231 may comprise a sequence of masking values (sometimes referred to as $a_i$) and a masked value (sometimes referred to as b). The masked value is computable from noise, a plain value, and a mask, e.g., using a masking function, e.g., by adding or subtracting modulo a modulus, etc. The mask is not known to system 201. The mask is computable from the masking values, provided one has access to a secret key (often indicated as s)—system 201 also does not have access to the secret key s. The secret key (s) comprises a sequence of secret key digits ($s_i$), a digit having one of at least three possible values. For example, the mask can be computed as dot product of the sequence of secret digits and the masking values. The masking values and secret key digits may be randomly chosen for a fresh encryption.

To obtain the masked value, in addition to combining masking value and plain value—some noise will also be incorporated to avoid a linear relationship. Encrypted values will typically either be obtained from outside system 201, or they will be the result of computations on system 201, e.g., output values or intermediate results. For example, the encryption of value 231 may be a so-called learning with error encryption (LWE) encryption.

A polynomial 210 is stored in system 201. Note that polynomial 210 need not be encrypted. This is indicated in FIG. 2*b* with a circle. Polynomial 210 could be encrypted but this is often not necessary. In applications, the polynomial 210 may represent an input-output relationship, e.g., exponents of polynomial 210 may represent input values while the coefficient corresponding to a particular exponent may represent the corresponding output value. The polynomial 210 is sometimes referred to as a test polynomial. For example, the test polynomials may be used to implement bootstrapping operations and more general function evaluation operations.

To rotate polynomial 210, an accumulator may be initialized, e.g., by an accumulator initiation unit 221. The accumulator may hold the intermediate result of rotating polynomial 210. Note that the accumulator 234 may be encrypted in a different manner as encrypted value 231. This type of encryption is indicated by a G, for 'general'. This may be a similar type of encryption as encrypted value 231, except with polynomials instead of with values. The G type of encryption could use the same key and the same number of masking polynomials as the number of masking values, but this is not necessary.

For example, instead of masking values, a masked value, and a masking values, these may all three be polynomials. For example, these may be GLWE values. Note that the key with which accumulator 234 is encrypted may also be different from the key used by the encrypted values, e.g., s' rather than s—both unknown to system 201. In fact, a key for GLWE values may use polynomials with binary coefficient instead of bits.

For example, the accumulator 234 may be initiated as $(ACC \leftarrow (0, \ldots, 0, X^{-\tilde{b}} \cdot \overline{v})$. The sequence of 0's represents the masking values. As the masking values are zero, in this case, it does not yet matter what key is used. The term $X^{-\tilde{b}} \cdot \overline{v}$ represents rotation over $-\tilde{b}$; it is computed, e.g., modulo $X^N + 1$. Here $N-1$ is the largest exponent used in polynomial 210. The rotation may be direct over the masked value b, but is may also be over a discretized version $-\tilde{b}$. This may for example be preferred if the number of exponents does not support the full size of b.

The rotation over the masked value, comprises a rotation of the plain value but also over the mask. The latter rotation is reverted in several iterations over the masking values. In each iteration, the accumulator is rotated for one more secret digits/masking values. For example, in an embodiment, at the beginning and end of each iteration the accumulator comprises an encryption of polynomial 210 rotated over some number of places. This may be done as follows. In an iteration, an encrypted multiplier polynomial 233 is computed. Multiplication with the encrypted multiplier polynomial is used to rotate the accumulator. However, as the encrypted multiplier polynomial 233 is encrypted, it is not known to system 201 over how many places this is done. To facilitate the multiplication, the encryption of polynomial 233 may use an encryption scheme that facilitates such multiplication. In particular one can make use of a so-called external multiplication, in which one operand is a polynomial encrypted as usual, e.g., as the accumulator while the other exponent is encrypted in a special manner. This is indicated in FIG. 2*b* as 'Ext' for external multiplication. The external multiplications are typically a resource intensive step. For example, this further encryption domain, e.g., chosen for its efficient multiplication with a polynomial, may be GGSW encryption.

After the construction of the encrypted multiplier polynomial P, it may be used to rotate the accumulator. Different options are possible. For example, one may arrange that P is equal to an encryption of a monomial, e.g., $P(X)=X^{s_j \tilde{a}_j}$, wherein $s_j$ is a secret digit and $\tilde{a}_j$, is a masking value (the tilde in $\tilde{a}_j$ indicates that the value may be discretized if needed to accommodate it; it may be that $\tilde{a}=a_j$, it may be that $\tilde{a}_j$ is obtained by scaling $a_j$; the same holds for b and $\tilde{b}$). Using a monomial for P may be done, e.g., if one binary bootstrapping key is used for each possible value of the secret key digit. Updating the accumulator may be done by computing the product Acc·P, typically using an external multiplication.

For example, one may arrange that P is equal to a monomial minus 1, e.g., $P(X)=X^{s_j \tilde{a}_j}-1$, wherein $s_j$ is a secret digit and $\tilde{a}_j$ is a masking value—this is the preferred choice. Using a monomial minus 1 for P may be done, e.g., if one binary bootstrapping key is used for each possible value of the secret key digit, except one value, e.g., zero. Updating the accumulator may be done by computing the product Acc·P and adding the accumulator, e.g., as Acc+Acc·P, again typically using an external multiplication—the addition may be in the same encryption domain as used for the accumulator, e.g., same encryption/decryption algorithms and same key. Alternatively, once could use $P(X)=X^{s_j \tilde{a}_j}+\alpha$ and update the accumulator as $-\alpha \cdot Acc+Acc \cdot P$, wherein $\alpha$ is a scalar, e.g., $-1$, 2, etc. Note that in the above options, the plain multiplier polynomial comprises a monomial with an exponent that is equal to the amount of blind rotation needed to correct for a masking value and secret digit combination, e.g., $X^{s_j \tilde{a}_j}$.

Thus, the blind rotation over an encrypted value 231, e.g., an encryption of the value μ, which may be a masking of a value μ*, e.g., a scaled and noisy version of μ, may be split-up over a rotation over the masked value—which can be done in plain, and further blind rotations indicated by the current secret key digit ($s_j$) and the corresponding masking value ($\tilde{a}_j$). The latter series of further blind rotations correct the initial rotation of the masked value, removing the mask and obtaining the correct rotated value, although in encrypted form. The series of iterations are then done in encrypted form, using homomorphic operations. Note that the encrypted value μ* may be discretized (as indicated by the tilde) or contain noise (as indicated by the star)

Note that one could correct for multiple masking values and secret digit combinations in one iteration, e.g., by including the monomial $$X^{s_{j1} a_{j1} + s_{j2} a_{j2}}$$

for two or more pairs of corresponding secret digit and masking value. If another combination function is chosen than multiplication, then a combination function may be included, e.g., $g(s_j, \tilde{a}_j)$, etc. The combination function could, say, be xor.

In yet a further variant, the multiplier polynomial could have more than one monomial. For example, the plain multiplier polynomial may be of the form $X^{e_1}-X^{e_2}$ for some $e_1$ and $e_2$. Such a form may be convenient when reducing the number of bootstrapping keys, but without assigning a special status to the zero value. Other terms in the multiplier polynomial could be accounted for during updating. The multiplier polynomial is typically only accessible in encrypted form to the system executing the computation.

Constructing the multiplier polynomial is done while encrypted. The details of constructing the multiplier polynomial depends on the particular encryption domain chosen, e.g., the particular set of algorithms for encrypting, decrypting, combining, and so on. Typically, constructing the encrypted multiplier polynomial is done on system 201, e.g., as the masking values may change depending on the run. For example, constructing the encrypted multiplier polynomial may use as input on the one hand, the masking value(s) that are corrected for in a particular iteration, these may be obtained from a storage on system 201, and bootstrapping keys that provide encrypted data items that together determine the particular value of a secret key digit or digits. For example, one approach is to compute the plain multiplier polynomial for all possible values of the secret key digit or digits(s) and use the bootstrapping keys to select the right one; the former may be done in plain while the latter is done under cover of encryption.

For example, in one possible construction one can generate all plain multiplier polynomials for all the possible values of a particular secret digit and a particular masking value (possibly discretized). The multiple plain multiplier polynomials can then be selected into a single encrypted multiplier polynomial using the bootstrapping keys to select under encryption. For example, in one possible choice for the multiplier polynomial, one can generate all plain polynomials, e.g., $(X^{A(i)\tilde{a}_j}-1)$, for all i and a given j, wherein $\tilde{a}_j$ is a, possibly scaled, masking value and A(i) represents the possible values of the secret digit $s_j$. For example, for ternary keys, one could take A(0)=−1; A(1)=0; A(1)=+1. The order in which A(i) goes through the possible values of the secret digit does not matter. Typically, one will choose consecutive values and/or values balanced around zero, the technique will work as well if this is not the case, e.g., A(0)=0; A(1)=1; A(2)=2; . . . ; A(9)=9 or A(0)=−1; A(1)=2; A(2)=3. The plain polynomials can now be combined within the encrypted domain in which the bootstrapping keys live. For example, one could compute an encrypted multiplier polynomial for iteration j as $P_j(X)=(\Sigma_{i=1}^{m-1} (X^{A(i)\tilde{a}_j}-1) \text{ bsk}[(m-1)(j-1)+i]))$ from the bootstrapping keys, the masking values $(a_i; \tilde{a}_j)$, the multiple possible values (A(i)) for the current secret key digit $(s_j)$ and performing an external product with the encrypted multiplier polynomial to further blind rotate the polynomial. In other words, a sequence of plain polynomials comprising various monomials $X^{e_i}$, multiplied (e.g., as a dot product), with a sequence of bootstrapping keys indicating which plain polynomials of the sequence is the actual one. However, the result of a multiplication with a bootstrapping keys and a plain polynomial is an encrypted polynomial—system 201 can no longer tell whether the result is 0 or another polynomial. The values e; may be the combination of the possible values of the secret digit and the masking value.

An interesting side effect of the multiplication of the type $(X^{A(i)\tilde{a}_j}-1) \text{ bsk}_j(i)$ is that the result may be encrypted in the same encryption domain as the bootstrapping key $\text{bsk}_j(i)$. A different encryption domain will typically mean a different key in addition to a different way of encryption.

Finally, the encrypted multiplier polynomial 233 is an encryption of a polynomial comprising a monomial $X^e$ to rotate the accumulator 234 over e steps. For example, the encrypted multiplier polynomial 233 may be an encryption of $X^e-1$ or $X^e+1$ or $X^e$, $X^e-X^d$ and so on. Interestingly, the encrypted multiplier polynomial 233 is in an encryption domain suitable for the multiplication, e.g., the external domain, while the accumulator may be in the general domain for general encryption of polynomials.

System 201 may be configured to update the accumulator, e.g., using an accumulator updating unit 223. For example, the accumulator updating unit 223 may multiply the encrypted polynomial multiplier with the accumulator. The latter may be done using an external multiplication, e.g., using an external multiplier 224. The external multiplier being external in the sense that it implements a so-called external multiplication, e.g., external to the encryption domain of accumulator 234 or value 231. The encrypted multiplier polynomial 233 may perform further steps, such as an addition of the accumulator to the external multiplication result. The inputs to the external multiplication may thus be an encrypted multiplier polynomial ($[\![P]\!]$) encrypted in the external encryption domain and an accumulator encrypted in the general encryption domain. The result of the external multiplication is in the general encryption domain. If the external multiplier polynomial is in a different encryption domain and uses a different key, say s', then the external multiplication may include a key switching step to go back to the key s. The key switching may include key-switching keys, which may be provided by the client, e.g., data provider 160. For example, the encrypted multiplier polynomial may be a GGSW encryption, and the blind rotated polynomials, e.g., the accumulator, may be GLWE encryption. As a side effect of blind rotation may be a switch from the key used to encrypt values to the key used to encrypt the bootstrapping keys, a key switch may be employed after a blind rotation as well.

Interestingly, in an iteration only one external multiplication is needed. The number of external multiplications is moreover independent of the number of possible values of the secret digits and of the number of bootstrapping keys that are used. In fact, in an embodiment, one external multiplication is used for each secret key digit. The number of external multiplications could be further reduced, for example by handling multiple secret digits in one iteration. The latter may come at a cost of more bootstrapping keys, while decreasing the number of external multiplications. For example, for a ternary key, one could use $2=(3^1-1)$ bootstrapping keys per secret digit, and one external multiplication per secret digit. However, one could also use $8=3^2-1$ bootstrapping keys and one external multiplication per two secret key digits; that is twice the number of bootstrapping keys but half the number of external multiplications.

Figure 4:
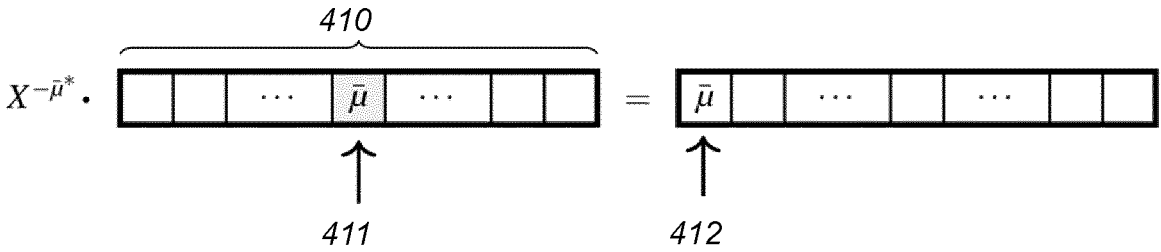

FIG. 4 schematically shows an example of an embodiment of a rotation of a test polynomial. A test polynomial encodes a mapping between input values and output values, by having the possible input values represented in the exponents of its monomials, while the coefficients represent the corresponding output values. Such a polynomial is called a test polynomial. For example, this may be used in a bootstrapping operation. The exponents represent values with a high noise level, where the coefficients represent the same value but noise-free or at a lower noise level. For example, this may be used to evaluate arbitrary functions in a homomorphic fashion. For example, the exponents represent values possibly with a high noise level, where the coefficients represent a function applied to the value and some noise being applied, typically a lower amount of noise than at the input. The latter thus combines function evaluation and bootstrapping.

FIG. 4 shows at 410 the sequence of coefficient of a test polynomial. For example, the left most square may represent the coefficient of $X^0$, the next square to the right the coefficient of $X^1$ and so on. The test polynomial 410 is blind rotated to the left over $\mu^*$ steps, that is the test polynomial is multiplied with $X^{-\mu^*}$; polynomial multiplication is modulo $X^N+1$. Note that in test polynomial some coefficient corresponds to the exponent $X^{+\mu^*}$, this is indicated with arrow 411. The coefficient shown in the square is the desired outcome; in the illustrated case this may be a bootstrapping operation. The desired outcome in this case is $\bar{\mu}$, e.g., the plain noise-reduced value corresponding to $\mu^*$. Note that $\mu^*$ and $\bar{\mu}$ denote particular plain values, which are typically not available to system 201. System 201 will have an encrypted version of $\tilde{\mu}^*$. The test polynomial itself can be plain though, as it records the plain relationship between input and output values. For example, at arrow 412 one could put $\overline{f(\mu)}$, to encode a function $f$.

After multiplication with $X^{-\tilde{\mu}*}$ the coefficient corresponding to the exponent $\tilde{\mu}^*$ has become the constant term. The constant term is indicated at the right, after blind rotation, with arrow 412. Note that the rotation itself is performed while encrypted. The rotated end result is an encrypted polynomial as well. By selecting, also known as sampling, the constant term one obtains an encryption of the function defined by the test polynomial, e.g., the bootstrapping. It is not necessary that the blind rotation and test polynomial are configured such that the desired outcome is obtained at the constant term, instead one could pick any fixed position in the coefficients and blind rotate such that the desired outcome is obtained at the fixed position.

Function evaluation can for example be used to implement a multiplication from a squaring operation. Consider a test polynomial in which the coefficients represent the square of the exponents; possibly also a noise reduction may be introduced in the coefficient as well. This test polynomial can be used as indicated herein to square a value. To multiply two numbers x and y, e.g., encrypted values, e.g., values such as value 231, e.g., LWE values one can compute the product as $(x+y)^2-x^2-y^2$ and divide by two, or as $$\frac{1}{4}(x+y)^2-\frac{1}{4}(x-y)^2,$$

etc. The divisions by 4 can be incorporated in the squaring. Division by 2 can be implemented as programmable bootstrapping as well.

For example, the FHE systems 110, 111-113, 200 and 201 may comprise a communication interface. The communication interfaces may be selected from various alternatives. For example, the interface may be a network interface to a local or wide area network, e.g., the Internet, a storage interface to an internal or external data storage, a keyboard, an application interface (API), etc. In particular, the communication interface may be configured to connect to a computer network. The communication interface may be used to receive a digital data set. The data set may comprise data items, e.g., parameters, values and the like on which computations are to be performed by the FHE system. The data set may comprise instructions, e.g., instructions indicating which FHE operations are to be performed. A data set may comprise both data items and instructions but this is not necessary. For example, in a first embodiment the FHE may be configured with an FHE program, e.g., a sequence of FHE operations possibly together with control commands. The configured FHE program may be executed on data received in the data set. For example, the data set may comprise encrypted sensor values, e.g., obtained from a sensor. For example, the data set may comprise auxiliary data configured to improve the FHE system, e.g., bootstrapping keys, e.g., to decrease noise build up, e.g., switch keys, to switch keys, and so on. Part of the data items may be in plain format, although this is not necessary. Operations on plain data can be performed much more efficiently. It is not unusual that data is a mix of, say, privacy sensitive information, and data which is not privacy sensitive. For example, the data set may on the one hand comprise medical information pertaining to some individual, and on the other hand thresholds against which the medical information needs to be evaluated. In an embodiment, the thresholds may be communicated plain while the medical information is encrypted.

For example, in a second embodiment, the FHE system may be configured with data e.g., a sequence of test values, while the operations to be performed on them are communicated in a data set. In a third embodiment, the FHE system may receive both data items and instructions in the data set.

An FHE system may have a user interface, which may include well-known elements such as one or more buttons, a keyboard, display, touch screen, etc. The user interface may be arranged for accommodating user interaction for configuring the systems, applying the system to new data, etc. Storage may be implemented as an electronic memory, say a flash memory, or magnetic memory, say hard disk or the like. Storage may comprise multiple discrete memories together making up the storage. Storage may comprise a temporary memory, say a RAM. The storage may be cloud storage.

The systems, e.g., system 110, 200, and 201, may be implemented in a single device. Typically, the system comprises one or more microprocessors which execute appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, the systems may comprise circuits for the evaluation of cryptographic primitives.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Below several further optional refinements, details, and embodiments are illustrated.

Define $\hat{\mathbb{Z}}_N[X]=(\mathbb{Z}/q\mathbb{Z})[X]/(X^N+1)$ where q and N are powers of 2. Define also the binary set $\mathbb{B}=\{0,1\}$ and $\mathbb{B}_N[X]=\mathbb{B}[X]/(X^N+1)$. For a secret key $s \overset{\$}{\leftarrow} +\mathbb{B}_N[X]^k$, the $\overline{\text{GLWE}}$ encryption of a plaintext $\bar{\mu}\in \hat{\mathbb{Z}}_N[X]$ is given by $\bar{c}=(\bar{a}_1, \ldots, \bar{a}_k, \bar{b})\in \hat{\mathbb{Z}}_N[X]^{k+1}$ where $\bar{a}_j \overset{\$}{\leftarrow} \hat{\mathbb{Z}}_N[X]$ and $\bar{b}=\Sigma_{j=1}^{k} s_j \bar{a}_j+\bar{\mu}^*$ with $\bar{\mu}^*=\bar{\mu}+\bar{e}$ for some random noise $\bar{e}$. We write $\bar{c}\leftarrow\overline{\text{GLWE}}_s(\bar{\mu})$. When (N,k)=(1, n), it turns out that $\hat{\mathbb{Z}}_N[X]=\mathbb{Z}/q\mathbb{Z}$ and the above procedure leads to an $\overline{\text{LWE}}$ ciphertext. We then write $\bar{c}\leftarrow\overline{\text{LWE}}_s(\bar{\mu})=(\bar{a}_1, \ldots, \bar{a}_n, \bar{b})\in(\mathbb{Z}/q\mathbb{Z})^{n+1}$ as the encryption of a plaintext $\bar{\mu}\in \mathbb{Z}/q\mathbb{Z}$ under the secret key $s=(s_1, \ldots, s_n)\in\mathbb{B}^n$, where $\bar{a}_j \overset{\$}{\leftarrow} \mathbb{Z}/q\mathbb{Z}$ and $\bar{b}=\Sigma_{j=1}^{n} s_j\bar{a}_j+\bar{\mu}^*$ with $\bar{\mu}^*=\bar{u}+\bar{e}$ for some random noise $\bar{e}$.

Bootstrapping may comprise a so-called blind rotation. It converts an $\overline{\text{LWE}}$ ciphertext $\bar{c}\leftarrow\overline{\text{LWE}}_s(\bar{\mu})\in(\mathbb{Z}/q\mathbb{Z})^{n+1}$ into $\bar{c}'\leftarrow\overline{\text{GLWE}}_{s'}(X^{-\bar{\mu}}\cdot\bar{v})\in \hat{\mathbb{Z}}_N[X]^{k+1}$; namely, a $\overline{\text{GLWE}}$ encryption of $X^{-\bar{\mu}*}\cdot\bar{v}$ under key $s'\in\mathbb{B}_N[X]^k$, where $\tilde{\mu}^*$ is a discretized value of $\bar{\mu}^* = \bar{\mu} + \bar{e}$ and $\bar{v}$ is a test polynomial. Specifically, if $\bar{c} = (\bar{a}_1, \ldots, \bar{a}_n, \bar{b})$ then $$-\tilde{\mu}^* = -\tilde{b} + \sum_{j=1}^{n} s_j\, \tilde{a}_j \pmod{2N} \text{ where} \qquad 5$$

$$\begin{cases} \tilde{b} = \left\lceil \dfrac{2N(\bar{b} \bmod q)}{q} \right\rceil \\[4mm] \tilde{a}_j = \left\lceil \dfrac{2N(\bar{a}_j \bmod q)}{q} \right\rceil \end{cases} (1 \le j \le n) \qquad 10$$

and the test polynomial $\bar{v}$ is programmed as a look-up table so that $X^{-\mu^*} \cdot \bar{v}$, up to drift, encodes $f(\bar{\mu})$ for a chosen function $f$. Algorithm 1 below shows a blind rotation algorithm, that uses n bootstrapping keys, 15 $bsk[j] \leftarrow \overline{GGSW}_{s'}(s_j)$ for $1 \le j \le n$.

---

Algorithm1: Blind rotation (binary case).

---
20
```
ACC ← (0, ...,0, X^{-b̃} · v̄ )
For j = 1 to n do
        ACC ← CMux(bsk[j],ACC, X^{ã_j} · ACC)
        /* ACC ← ACC + bsk[j] ⊡ (X^{ã_j} − 1) · ACC) */
return ACC
```
---
25
The blind rotation can be calculated as a series of CMux operations. On input a $\overline{GGSW}$ ciphertext $\bar{C}$ encrypting a bit $b \in \{0,1\}$ and two $\overline{GLWE}$ ciphertexts $\bar{c}_0$ and $\bar{c}_1$, the CMux operation outputs a ciphertext encrypting the same plaintext 30 as $\bar{c}_b$, $$\bar{c}' \leftarrow CMux(\bar{C}, \bar{c}_0, \bar{c}_1) := \bar{c}_0 + \bar{C} \boxdot (\bar{c}_1 - \bar{c}_0)$$

35
where $\boxdot$ denotes the external product of ciphertexts. It can be verified that at the end of the loop the accumulator ACC contains a $\overline{GLWE}$ encryption of $X^{-\bar{\mu}^*} \cdot \bar{v}$ under key $s'$. Conventional FHE systems are inherently restricted to binary keys. Algorithm 1 above is algorithm 4 in the paper "TFHE: Fast Fully Homomorphic Encryption over the Torus" by Ilaria Chillotti, Nicolas Gama, Mariya Georgieva, and Malika Izabachène, included herein by reference. The inventors found that if algorithm 1 were extended to, say, ternary keys, then of $$\overline{GLWE}_{s'}\left( X^{-\tilde{b} + \sum_{j=1}^{n} s_j \tilde{a}_j} \cdot \bar{v} \right)$$

would involve 2n external products. For a same value of n, this is twice more than in the binary case. This corresponds almost to a doubling of the workload. It would be advantageous if the range of secret key digits could be extended without incurring a penalty in the form of the number of external products.

In an embodiment, blind rotation for ternary keys can be largely improved. It is observed that the monomial $X^{s_j \tilde{a}_j} = X^{(s_j^1 - s_j^2)\tilde{a}_j}$ with $s_j^1, s_j^2 \in \{0,1\}$ can be expressed in an additive way as: $X^{s_j \tilde{a}_j} = s_j^1(X^{\tilde{a}_j} - 1) + s_j^2(X^{-\tilde{a}_j} - 1) + 1$. The 2n bootstrapping keys may be defined as $bsk[2(j-1)+i] \leftarrow \overline{GGSW}_{s'}(s_j^i)$ for all $1 \le j \le n$ and for all $1 \le i \le 2$. An application of the $\overline{GSW}$ encryption to the above relation leads to $$\overline{GGSW}_{s'}\left( X^{s_j \tilde{a}_j} \right) \leftarrow$$
$$\left( X^{\tilde{a}_j} - 1 \right) bsk[2j-1] + \left( X^{-\tilde{a}_j} - 1 \right) bsk[2j] + \overline{GGSW}_{s'} \quad (1).$$

Accordingly, the following exemplifying embodiment A may be described as follows:

---

Embodiment A: Blind rotation (ternary case)

---
```
ACC ← (0, ... ,0, X^{-b̃} · v̄ )
For j = 1 to n do
        ACC ← ACC + ((X^{-ã_j} − 1) bsk[2j − 1] + (X^{-ã_j} − 1) bsk[2j]) ⊡ ACC
End for
return ACC
```
---

Interestingly, the calculation of a blind rotation with ternary keys in embodiment A only requires n external products for a secret key with n ternary digits. The inventors realized this approach may be used for digits allowing more than 3 values. In fact, the proposed approach can be adapted to support arbitrary formats of keys.

For full generality, we suppose that the keys are drawn from an arbitrary set $\mathcal{S}$ (e.g., $\mathcal{S}=\{0,1,-1\}$ for ternary keys). We let $m=\#\mathcal{S}$ denote the cardinality of $\mathcal{S}$. The monomial $X^{s_j \tilde{a}_j}$ can be written additively as $$X^{s_j a_j} = \sum_{t \in \mathcal{S}} 1\{t = s_j\}\, X^{t\, a_j}$$
$$= 1 + \sum_{t \in \mathcal{S}\setminus\{0\}} 1\{t = s_j\}\left(X^{t\, a_j} - 1\right).$$

Herein, the predicate function 1 is defined as: $1\{t=s_j\}=1$ when $t=s_j$ and $1\{t=s_j\}=0$ otherwise. Define the set $I=\{0,\ldots,m-1\}$. The alphabet may be defined as a vector $A \in \mathcal{S}^m$ whose components are the different elements of $\mathcal{S}$. For example, for ternary keys one might have $m=3$ and write $A=(0,1,-1)$ so that $A[0]=0$, $A[1]=1$ and $A[2]=-1$. Vector A gives rise to a function: $A: I \rightarrow \mathcal{S}$, $i \mapsto A(i)=A[i]$, taking on as input an index $i \in I$ and returning the ith component of A, e.g., starting at $i=0$. One may therefore write $$X^{s_j \tilde{a}_j} = \sum_{i=0}^{m-1} 1\{A(i) = s_j\} X^{A(i)\tilde{a}_j}.$$

Denoting with $\tau_0=A[0]=A(0)$ a first digit in the alphabet, one may write:

$$X^{s_j \tilde{a}_j} = X^{\tau_0 \tilde{a}_j} + \sum_{i=1}^{m-1} 1\{A(i) = s_j\}\left(X^{A(i)\tilde{a}_j} - X^{\tau_0 \tilde{a}_j}\right).$$

Compared to the previous expression for $X^{s_j \tilde{a}_j}$ this uses one fewer predicate function. An advantageous choice is to take $\tau_0=0$. The expression then becomes:

$$X^{s_j \tilde{a}_j} = 1 + \sum_{i=1}^{m-1} 1\{A(i) = s_j\}\left(x^{A(i)\tilde{a}_j} - 1\right).$$

Hence, defining $n(m-1)$ bootstrapping keys $bsk[(m-1)(j-1)+i]\leftarrow \overline{GGSW}_{s'}(\sigma_{j,t})$ where $\sigma_{j,t}=1\{t=s_j\}$ and with $t=A(i)$, for all $1\leq j\leq n$ and for all $1\leq i\leq m-1$, one obtains the algorithm below. Surprisingly, the number of external products remains equal to n—the number of secret digits. For a given security level, we note the value of n is a decreasing function of m.

---

Embodiment B1. Blind rotation (higher-radix case).

---

ACC $\leftarrow$ (0, ... ,0, $X^{-b} \cdot \overline{\varpi}$)
For j = 1 to n do
        ACC $\leftarrow$ $X^{A(0)\,\tilde{a}_j}$ ACC + $(\Sigma_{i=1}^{m-1}$ $(X^{A(i)\,\tilde{a}_j} - X^{A(0)\,\tilde{a}_j})$ $bsk[(m-1)(j-1)+i])$
   $\boxdot$
ACC
Endfor
return ACC

---

Choosing one of the possible values of the secret digits to be 0, one obtains the following optimization:

---

Embodiment B2. Blind rotation (higher-radix case).

---

ACC $\leftarrow$ (0, ... ,0, $X^{-b} \cdot \overline{\varpi}$)
For j = 1 to n do
        ACC $\leftarrow$ ACC + $(\Sigma_{i=1}^{m-1}$ $(X^{A(i)\,\tilde{a}_j} - 1)$ $bsk[(m-1)(j-1)+i])$ $\boxdot$ ACC
Endfor
return ACC

---

A reduction in the number of external multiplications can be obtained by processing multiple digits of the secret key concurrently. Below this is detailed for two secret key digits. As shown above, the monomial $X^{s_j \tilde{a}_j}$ may be additively expressed as $$X^{s_j \tilde{a}_j} = \sum_{t \in S} \sigma_{j,t} \cdot X^{t \tilde{a}_j}$$

with $\sigma_{j,t} = 1\{t = s_j\}$. With two digits, this generalized to $$X^{s_{j_1} \tilde{a}_{j_1} + s_{j_2} \tilde{a}_{j_2}} = X^{s_{j_1} \tilde{a}_{j_1}} X^{s_{j_2} \tilde{a}_{j_2}}$$

$$= \left(\sum_{t \in S} \sigma_{j_1,t} \cdot X^{t \, \tilde{a}_{j_1}}\right)\left(\sum_{t \in S} \sigma_{j_2,t} \cdot X^{t \, \tilde{a}_{j_2}}\right)$$

$$= \sum_{t_1 \in S} \sum_{t_2 \in S} \sigma_{j_1,t_1} \sigma_{j_2,t_2} \cdot X^{t_1 \tilde{a}_{j_1}} X^{t_2 \tilde{a}_{j_2}}$$

$$= X^{\tau_0 (\tilde{a}_{j_1} + \tilde{a}_{j_2})} + \sum_{(t_1,t_2) \in S^2 \setminus \{(\tau_0,\tau_0)\}} \sigma_{j_1,t_1} \sigma_{j_2,t_2} \cdot$$

$$\left(X^{t_1 \tilde{a}_{j_1} + t_2 \tilde{a}_{j_2}} - X^{\tau_0 (\tilde{a}_{j_1} + \tilde{a}_{j_2})}\right).$$

Which, for $\tau_0 = 0$, may simplify to:

$$1 + \sum_{\ldots} \sigma_{j_1,t_1} \sigma_{j_2,t_2} \cdot \left(X^{t_1 \tilde{a}_{j_1} + t_2 \tilde{a}_{j_2}} - 1\right).$$

More generally, for d digits, one gets:

$$X^{\sum_{l=1}^{d} s_{j_l} \tilde{a}_{j_l}} = 1 + \sum_{\ldots} \left(\bigwedge_{l=1}^{d} \sigma_{j_l,t_l}\right) \cdot \left(X^{\sum_{l=1}^{d} t_l \tilde{a}_{j_l}} - 1\right)$$

To ease the presentation, we henceforth assume that d|n. We can write $$\sum_{j=1}^{n} s_j \tilde{a}_j = \sum_{h=1}^{n/d} \sum_{l=1}^{d} s_{(h-1)d+l} \tilde{a}_{(h-1)d+l}. \text{ Define } \frac{n}{d}(m^d - 1)$$

bootstrapping keys as $$bsk\left[(m^d - 1)(h - 1) + \sum_{l=1}^{d} i_l m^{l-1}\right] \leftarrow \overline{GGSW}_{S\digamma}\left(\bigwedge_{l=1}^{d} \sigma_{(h-1)i+l, t_l}\right)$$

with $(t_1, \ldots, t_d) = (A(i_1), \ldots, A(i_d))$, for all $1 \le h \le n/d$ and for all $(i_1, \ldots, i_d) \in \{0, \ldots, m-1\}^d$ with $(i_1, \ldots, i_d) \ne (0, \ldots, 0)$. The number of external products decreases to n/d.

Embodiment C1: Blind Rotation (General-Radix Case)

ACC $\leftarrow (0, \ldots, 0, X^{-\bar{b}} \cdot \vec{v})$
For h = 1 to n/d do
   ACC $\leftarrow X^{A(0)} \sum_{l=1}^{d} \tilde{a}_{(h-1)d+l} \cdot$ ACC $$+ \left(\sum_{\substack{0 \le i_1, \ldots, i_d \le m-1 \\ (i_1, \ldots, i_d) \ne (0, \ldots, 0)}} \left(X^{\sum_{l=1}^{d} A(i_l) \tilde{a}_{(h-1)d+l}} - X^{A(0) \sum_{l=1}^{d} \tilde{a}_{(h-1)d+l}}\right)\right.$$

-continued $$bsk\left[(m^d - 1)(h - 1) + \sum_{l=1}^{d} i_l m^{l-1}\right] \boxed{\cdot} ACC$$

Endfor
return ACC

Embodiment C2: Blind Rotation (General-Radix Case)

ACC $\leftarrow (0, \ldots, 0, X^{-\bar{b}} \cdot \vec{v})$
For h = 1 to n/d do $$ACC \leftarrow ACC + \left(\sum_{\substack{0 \le i_1, \ldots, i_d \le m-1 \\ (i_1, \ldots, i_d) \ne (0, \ldots, 0)}} \left(X^{\sum_{l=1}^{d} A(i_l) \tilde{a}_{(h-1)d+l}} - 1\right)\right.$$

$$bsk\left[(m^d - 1)(h - 1) + \sum_{l=1}^{d} i_l m^{l-1}\right] \boxed{\cdot} ACC$$

Endfor
return ACC

Embodiment C2 assumes that one of the possible values of a secret key digit is 0, e.g., $\tau_0 = 0$. This it is not necessary though. In embodiment C1 and C2, d secret digits are processed in one iteration, e.g., with one external multiplication. It is not needed that the processed digits are consecutive. For example, d may be 2 or more, 3 or more, etc.

An encrypted value may use a sequence of n masking values ($a_i$). To mask the plain value also some noise is also added with noise parameter $\sigma$. The encryption is also sometimes referred to as a noisy encryption. Some possible values for n and $\sigma$ are as follows:

TABLE 1

| Possible values for n and $\sigma$ on a 32-bit implementation | |
|---|---|
| n | $\sigma$ |
| 630 | $2^{-15}$ |
| 567 | $2^{-13.35}$ |
| 606 | $2^{-14.37}$ |

The above numbers may be used in an LWE encryption. The values are suggestions for an acceptable combination of performance, security, and reliability. Specific embodiments with specific requirements regarding, e.g., performance, security, and failure risk may want to choose, e.g., a lower n for higher performance; a higher n and/or a higher $\sigma$ for higher security; and a lower $\sigma$ for higher reliability. GLWE can use similar numbers, noting that GLWE encryption uses polynomials.

A secret digits has more than two possible values. Suggestions include ternary digits, e.g., having digits −1, 0, 1; In an embodiment, the possible values of a secret digit are balanced around zero, for example for some integer h, a secret digit may have the following values: {−h, −h+1, ..., 0, 1, ..., h−1, h}. For example, one may set h to 1, or 2, or 3, etc. Typically, all secret digits are allowed to have the same number of possible values, although this is not necessary. Balanced possible values have the advantage that they lead to a lower increase of noise during FHE operations.

A value of secret key can be encoded by multiple data items representing the secret key digit. A good choice for the multiple data items are bits. The multiple data items may be implemented as a vector of 0 bits and at most one 1; the 1 indicating the value of the secret key digits. Encrypting the elements of the vectors provides bootstrapping keys.

For completeness, a possible implementation of some FHE operations, including an external multiplication is given below. FHE enables directly performing operations on ciphertexts. Depending on the type of operation, the resulting noise level increases more or less.

Addition $\overline{\text{LWE}}$ and $\overline{\text{GLWE}}$ ciphertexts are homomorphic with respect to the addition. For example, let $\overline{c}_1 \leftarrow \overline{\text{GLWE}}_s(\overline{\mu}_1)$ and $\overline{c}_2 \leftarrow \overline{\text{GLWE}}_s(\overline{\mu}_2)$ with $\overline{c}_1, \overline{c}_2 \in \hat{\mathbb{Z}}_N[X]^{k+1}$ be the respective encryptions of plaintexts $\overline{\mu}_1, \overline{\mu}_2 \in \hat{\mathbb{Z}}_N[X]$; i.e., $$\overline{c}_i = (\overline{a}_1^{(i)}, \ldots, \overline{a}_k^{(i)}, \overline{b}_i)(i \in 1,2)$$

$$\text{with } \overline{b}_i = \sum_{j=1}^{k} s_j \overline{a}_j^{(i)} + \overline{\mu}_i + \overline{e}_i.$$

$$\text{Then } \overline{c}_3 = \overline{c}_1 + \overline{c}_2 = (\overline{a}_1^{(1)} + \overline{a}_1^{(2)}, \ldots, \overline{a}_k^{(1)} + \overline{a}_k^{(2)}, \overline{b}_1 + \overline{b}_2)$$

is a $\overline{\text{GLWE}}$ encryption of $(\overline{\mu}_1 + \overline{\mu}_2) \in \hat{\mathbb{Z}}_N[X]$, provided that the resulting noise $\overline{e}_3 = \overline{e}_1 + \overline{e}_2$ remains small.

Scalar Multiplication

By extension, $\overline{\text{LWE}}$ and $\overline{\text{GLWE}}$ ciphertexts are homomorphic with respect to multiplication by a constant. For example, let $K \in \mathbb{Z}_{\geq 0}$ and $\overline{c} \leftarrow \overline{\text{GLWE}}_s(\overline{\mu}) = (\overline{a}_1, \ldots, \overline{a}_k, \overline{b})$ with $\overline{b} = \sum_{j=1}^{k} s_j \overline{a}_j + \overline{\mu} + \overline{e}$. Then $$K \cdot \overline{c} = \underbrace{\overline{c} + \ldots + \overline{c}}_{K \text{ times}}$$

is an encryption of $K \cdot \overline{\mu} \in \hat{\mathbb{Z}}_N[X]$, provided that $K \cdot \overline{e}$ keeps small. If $K < 0$ then $K \cdot \overline{c} = (-K) \cdot (-\overline{c})$. More generally, if $\mathcal{K} \in \hat{\mathbb{Z}}_N[X]$ then $\mathcal{K} \cdot \overline{c}$ is an encryption of $\mathcal{K} \cdot \mu \in \hat{\mathbb{Z}}_N[X]$, provided that $\mathcal{K} \cdot \overline{e}$ keeps small.

External Product $\overline{\text{LWE}}$ and $\overline{\text{GLWE}}$ ciphertexts do not support a native internal multiplication which, in practice, means that two $\overline{\text{GLWE}}$ ciphertexts cannot be directly multiplied. In order to perform a multiplication, an external multiplication may be used. The external multiplication of ciphertexts takes as input, say, a $\overline{\text{GLWE}}$ ciphertext and the encryption of a multiplier m. The latter may be encrypted using a different type of encryption which is more suitable for multiplication. In turn the external multiplication can be used to define more general multiplication. For example, a matrix-based approach to external multiplication is the GSW construction, e.g., as described in the paper "Computing Arbitrary Functions of Encrypted Data", by Craig Gentry and included herein by reference. We write $\overline{\text{LWE}}$, $\overline{\text{GLWE}}$ and $\overline{\text{GGSW}}$ for the corresponding encryption algorithm. The particular case $(k,N)=(n, 1)$ is denoted by $\overline{\text{GSW}}$.

With the previous GLWE notation, let parameters $B=2^\beta$ and $\ell$ with $\beta$, $\ell \geq 1$ and such that $\ell \beta \leq \Omega$ where $\Omega$ denotes the bit-precision; $q=2^\Omega$. Define also the vector $g=(2^{\Omega-\beta}, 2^{\Omega-2\beta}, \ldots, 2^{\Omega-\ell\beta})$. The $\overline{\text{GGSW}}$ encryption of a plaintext $m \in \mathbb{Z}_N[X]$ with respect to a $\overline{\text{GLWE}}$ encryption key $s \in \mathbb{B}_N[X]^k$ is defined as $$\overline{C} \leftarrow \overline{\text{GGSW}}_s(m) := \overline{Z} + m \cdot G^\top \in \hat{\mathbb{Z}}_N[X]^{(k+1)\ell \times (k+1)}$$

where $$\overline{Z} \leftarrow \left. \begin{pmatrix} \overline{\text{GLWE}}_s(0) \\ \overline{\text{GLWE}}_s(0) \\ \vdots \\ \overline{\text{GLWE}}_s(0) \end{pmatrix} \right\} (k+1)\ell \text{ rows}$$

is a matrix containing on each row a fresh $\overline{\text{GLWE}}$ encryption of 0 and where $$G^\top = I_{k+1} \otimes g^T = \text{diag}(\underbrace{g^\top, \ldots, g^\top}_{k+1}) \in \mathbb{Z}_N[X]^{(k+1)\ell \times (k+1)}$$

is the so-called gadget matrix, with $I_{k+1}$ the identity matrix of size k+1. It is worth noting that any element d in $\mathbb{Z}/q\mathbb{Z}$, viewed as an integer in $$\left[-\frac{q}{2}, \frac{q}{2}\right],$$

can always be approximated by a signed-digit radix-B expansion of size $\ell$ as $$d \approx q \sum_{i=1}^{\ell} d_i B^{-i} = \sum_{i=1}^{\ell} d_i 2^{\Omega-i\beta} = g^{-1}(d)g^\top$$

where $g^{-1}(d):=(d_1, \ldots, d_\ell) \in \mathbb{Z}^\ell$ with digits $$d_i \in \left[-\frac{B}{2}, \frac{B}{2}\right]$$

and with an approximation error that is bounded by $|g^{-1}(d) \cdot g^T - d| \leq q/(2B^\ell) = 2^{\Omega-\beta\ell-1}$.

By extension, for a polynomial $\mathcal{P} = p_0 + \ldots + p_{N-1} X^{N-1} \in \hat{\mathbb{Z}}_N[X]$ whose coefficients are viewed as integers in $$\left[-\frac{q}{2}, \frac{q}{2}\right],$$

the decomposition $g^{-1}(\mathcal{P}) \in \mathbb{Z}_N[X]]^\ell$ is defined as $g^{-1}(\mathcal{P}) = \sum_{j=0}^{N-1} g^{-1}(p_j) X^j$. Clearly, it holds that $\|g^{-1}(\mathcal{P})g^\top - \mathcal{P}\|_\infty \leq 2^{\Omega-\beta\ell-1}$. Finally, for a vector of k+1 polynomials, $\mathcal{P} = (\mathcal{P}_1, \ldots, \mathcal{P}_{k+1}) \in \hat{\mathbb{Z}}_N[X]^{k+1}$, the decomposition $G^{-1}(\mathcal{P}) \in \mathbb{Z}_N[X]]^{(k+1)\ell}$ is defined as $G^{-1}(\mathcal{P}) = (g^{-1}(\mathcal{P}_1), \ldots, g^{-1}(\mathcal{P}_{k+}))$ and $\|G^{-1}(\mathcal{P})G^{2p\tau} - \mathcal{P}\|_\infty \leq 2^{\Omega-\beta\ell-1}$.

Interestingly, the gadget decomposition of $\overline{\text{GLWE}}$ ciphertexts gives rise to an external product with $\overline{\text{GGSW}}$ ciphertexts. Specifically, for plaintexts $m_1 \in \mathbb{Z}_N[X]$ and $\mu_2 \in \hat{\mathbb{Z}}_N$ [X], if $\bar{c}_1 \leftarrow \overline{\text{GGSW}}_s(m_1)$ and $\bar{c}_2 \leftarrow \overline{\text{GLWE}}(\mu_2)$ then their external product, denoted by $\boxdot$, is given by $$\bar{c}_3 = \bar{c}_1 \boxdot \bar{c}_2 := G^{-1}(\bar{c}_2)\bar{c}_1.$$

A little algebra shows that $$\bar{c}_3 = G^{-1}(\bar{c}_2)(\bar{Z} + m_1 \cdot G^\top) = \underbrace{G^{-1}(\bar{c}_2)\bar{Z}}_{=\overline{\text{GLWE}}\boldsymbol{\xi}^{(0)}} + \underbrace{m_1 \cdot G^{-1}(\bar{c}_2)G^T}_{=m_1\bar{c}_2}$$

is a $\overline{\text{GLWE}}$ encryption of $m_1\mu_2 \in \hat{\mathbb{Z}}_N[X]$, provided that the resulting noise (including the approximation error) keeps small.

The CMux Gate

Starting from the external product, a new leveled operation can be defined: the 'controlled' multiplexer or CMux. A CMux acts as a selector according to a bit—but over encrypted data. It takes as input two $\overline{\text{GLWE}}$ ciphertexts $\bar{c}_0$ and $\bar{c}_1$, respectively encrypting plaintexts $u_0$ and $u_1 \in \hat{\mathbb{Z}}_N$ [X], and a $\overline{\text{GGSW}}$ ciphertext $\bar{c}$ encrypting a bit b. The result is a $\overline{\text{GLWE}}$ ciphertext $\bar{c}'$ encrypting $u_b$, provided that the resulting noise keeps small. The CMux gate is given by:

$$\bar{c}' \leftarrow CMux(\bar{c}, \bar{c}_0, \bar{c}_1) := \bar{c}\boxdot(\bar{c}_1 - \bar{c}_0) + \bar{c}_0.$$

It can be used for homomorphic computations and, especially, inside bootstrapping.

At the end of the loop of embodiments, A, B1, B2, and C, ACC contains a $\overline{\text{GLWE}}$ encryption of $X^{-\bar{\mu}*} \cdot \bar{v}$ under key $s'$. Indeed, let $c'_j$ denote the value of the accumulator ACC at iteration i=j; namely, $$\bar{c}'_j \leftarrow \overline{\text{GLWE}}_{s'}\left(X^{-\bar{b}+\sum_{i=1}^{j} s_i \bar{a}_i} \cdot \bar{v}\right).$$

As a consequence, letting $\bar{c}' = \bar{c}'_n$, we then get $$\bar{c}' \leftarrow \underbrace{\overline{\text{GLWE}}_{s'}\left(X^{-\bar{b}+\sum_{i=1}^{n} s_i \bar{a}_i} \cdot v\right)}_{=\overline{\text{GLWE}}\boldsymbol{\xi}^{(X^{-\bar{\mu}*} \cdot v)}} \leftarrow \overline{\text{GLWE}}\boldsymbol{\xi}^{(u)}$$

for some polynomial $\bar{u} \in \hat{\mathbb{Z}}_N$ [X] whose constant term is $\bar{\mu}$; i.e., $\bar{u} := X^{-\bar{\mu}*} \cdot \bar{v} = \bar{u}_0 + \bar{u}_1 X + \ldots + \bar{u}_{N-1} X^{N-1}$ where $\bar{u}_0 = \bar{\mu}$, as desired. The remaining step of the bootstrapping consists in extracting the constant coefficient of $\bar{u} = X^{-\bar{\mu}*} \cdot \bar{v}$ as a $\overline{\text{LWE}}$ ciphertext of $\bar{\mu}$. This is an easy operation—called sample extraction—which is performed by simply extracting some of the coefficients of the $\overline{\text{GLWE}}$ ciphertext.

In more detail, let $s' = (s'_1, \ldots, s'_k) \in \mathbb{B}_N[X]^k$ with $s'_j = s'_{j,0} + \ldots + s'_{j,N-1} X^{N-1}$ for $1 \le j \le k$. Parsing $\bar{c}' \leftarrow$ $\overline{\text{GLWE}}_{s'}(\bar{u}) \in \hat{\mathbb{Z}}_N[X]^k$ as $(\bar{a}_1, \ldots, \bar{a}_k, \bar{b}')$ with $a'_j = \bar{a}_{j,0} + \ldots + \bar{a}_{j,N-1} X^{N-1}$ for $1 \le j \le k$ and $\bar{b}' = \bar{b}_0 + \ldots + \bar{b}_{N-1} X^{N-1}$, it can be verified that $\bar{c}' := (\bar{a}'_{1,0}, -\bar{a}'_{1,N-1}, \ldots, -$ $a'_{1,1}, \ldots, \bar{a}'_{k,0}, -\bar{a}'_{k,N-1}, \ldots, -\bar{a}'_{k,1}, \bar{b}_0) \in (\mathbb{Z}/q\,\mathbb{Z})^{kN+1}$ is a $\overline{\text{LWE}}$ encryption of $\bar{\mu}$ under the key $s' = (s'_1, \ldots, s'_{kN}) \in \mathbb{B}^{kN}$ where $s'_{l+1+(j-1)N} := s'_{j,l}$ for $1 \le j \le k$ and $0 \le l \le N-1$.

If desired, a key switch be performed. This may be done, for example, to switch back to the original key if the blind rotation caused a key switch. For example, with the above procedure, input ciphertext $c \leftarrow \overline{\text{LWE}}_s(\bar{\mu}) \in (\mathbb{Z}/q\,\mathbb{Z})^{n+1}$ and resulting output ciphertext $\bar{c}' \leftarrow \overline{\text{LWE}}_{s'}(\bar{\mu}) \in (\mathbb{Z}/q\,\mathbb{Z})^{kN+1}$ both encrypt plaintext $\bar{\mu}$ but make use of different keys and have a different format.

In order to convert $\bar{c}'$ back to the original setting, an operation called key switching can be performed. The key-switching technique is classical in FHE; it can be used to switch encryption keys in different parameter sets. Its implementation may use key-switching keys: they may comprise an $\overline{\text{LWE}}$ encryption of the key bits of s' with respect to the original key s. The procedure may seem conceptually very similar to the bootstrapping, but there is a fundamental difference between the two techniques: bootstrapping reduces the noise (and is computationally demanding) whereas the key switching makes the noise increase (but is cheaper to evaluate). For example, assume one is given the key-switching keys $$ksk[i, j] \leftarrow \overline{\text{LWE}}_s\left(s'_i \cdot \frac{q}{B_{ks}^j}\right),$$

for all $1 \le i \le kN$ and $1 \le i \le \ell_{ks}$ for some parameters $B := B_{ks}$ and $\ell := \ell_{ks}$ defining a gadget decomposition. On input $\overline{\text{LWE}}$ ciphertext $c' \leftarrow \overline{\text{LWE}}_{s'}(\bar{\mu}) = (\bar{a}'_1, \ldots, \bar{a}'_{kN}, \bar{b}') \in (\mathbb{Z}/q\,\mathbb{Z})^{kN+1}$ under the key $s' = (s_1, \ldots, s_{kN}) \in \mathbb{B}^{kN}$, $$\bar{c}'' := (0, \ldots, 0, \bar{b}') - \sum_{i=1}^{kN} \sum_{j=1}^{\ell_{ks}} \bar{a}'_{i,j} ksk[i, j]$$

$\in (»/q»)^{n+1}$ where $(\bar{a}'_{i,1}, \ldots, \bar{a}'_{i,\ell_{ks}}) = g^{-1}(\bar{a}'_i)$ is a $\overline{\text{LWE}}$ encryption of $\bar{\mu}$ under key s, provided that the resulting noise keeps small.

More details on bootstrapping, programmable bootstrapping, and their application to the homomorphic evaluation of neural networks can be found in "Programmable Bootstrapping Enables Efficient Homomorphic Inference of Deep Neural Networks", cited above and included herein by reference.

Figure 5:
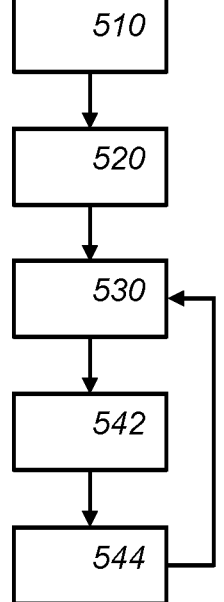

FIG. 5 schematically shows an example of an embodiment of a computing method 500. Method 500 implements a blind rotation of polynomial in a homomorphic manner. That is the computations and the end-result of the rotation are performed while encrypted. The polynomial that is rotated, e.g., one of the inputs to the method may be plain, although the rotated polynomial is encrypted. The method may be implemented on a computer. The method may comprise:

Receiving 510 encrypted values. For example, the encrypted values may be received over a communication interface such as a communication interface for a computer network. Encrypted values may represent all kinds of data, in particular they may represent technical data, e.g., sensor values obtained from a value. FHE operations may be performed on the encrypted values that are received. In addition, FHE operations may be performed on other encrypted values, e.g., intermediate results, or previously stored value and the like.

Also received are auxiliary FHE data, the auxiliary data may be encrypted with the same key as the encrypted values and may be used to perform or optimize, etc., the FHE operations. In particular, bootstrapping keys are received.

The blind rotation selectively rotates coefficients of a polynomial as indicated by an encrypted value. For example, a blind rotation may be regarded as a multiplication of the type $X^{-u}$ f(X) modulo a polynomial—typically modulo $X^N+1$, wherein f is a polynomial and u is a value, except that the value u is only available in encrypted form. The output of the blind rotation is also encrypted. The method comprises rotating 520 the polynomial over the masked value in the encrypted value and iterating 530 over the secret key digits. For example, part 530 may implement such control flow operations as "For j=1 to n do"—in case the iteration is over each secret digit individually, or "For j=1 to n/d do"—in case iterations take some digits together.

An iteration may use an external multiplication 544 with an encrypted multiplier polynomial to implement an iteration. For example, in computing part 542 an encrypted multiplier polynomial is constructed from the bootstrapping keys and the masking values. The external multiplication 544 may also comprise other arithmetic operations, e.g., an addition, as in an embodiment.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 6A:
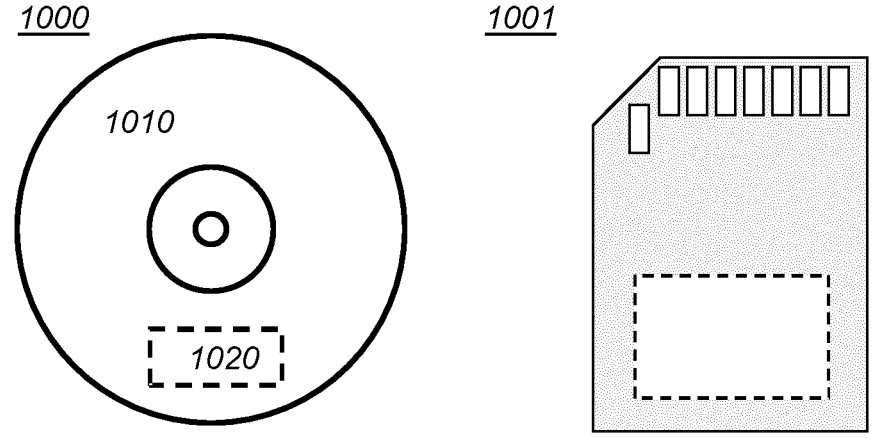

FIG. 6a shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform an embodiment of a blind rotation method, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said blind rotation method.

Figure 6B:
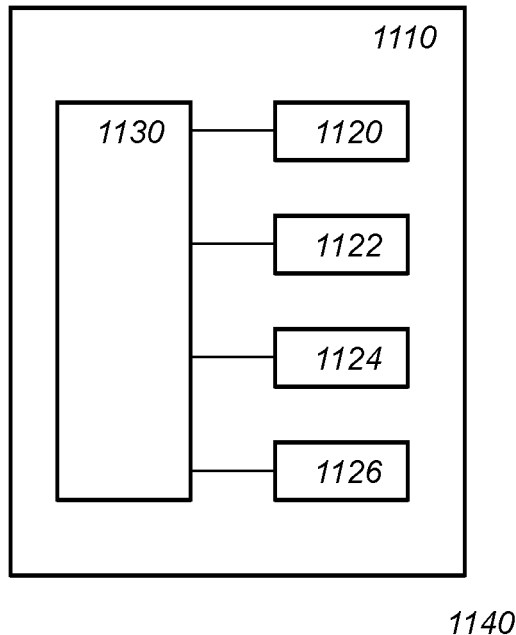

FIG. 6b shows in a schematic representation of a processor system 1140 according to an embodiment of an FHE device or system. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method.

Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the FHE system or device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1110 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1110 is implemented in a cloud computing system, the various hardware components may belong to separate physical systems. For example, the processor 1120 may include a first processor in a first server and a second processor in a second server.

The following numbered clauses include embodiments that are contemplated and nonlimiting.

1. A computer-implemented blind rotation method for use in fully homomorphic encryption (FHE), the method comprising:

receiving encrypted values (LWE) and bootstrapping keys, performing a blind rotation, the blind rotation selectively rotating coefficients of a polynomial ($\overline{v}$(X)) as indicated by an encrypted value, the encrypted value comprising a sequence of masking values ($a_i$; $\tilde{a}_i$) and a masked value (b), the masked value being computable from a plain value, a mask ($\Sigma a_i s_i$) and noise, the mask being computable from a secret key (s) and the sequence of masking values, the secret key (s) comprising a sequence of secret key digits ($s_i$), a digit having one of at least three possible values, multiple bootstrapping keys corresponding to each secret key digit, the multiple bootstrapping keys being an encryption of multiple data items representing the secret key digit, performing the blind rotation comprising:

rotating the polynomial over the masked value (b) and iterating over the secret key digits once (For j=1 to n do; For j=1 to n/d do), an iteration further blind rotating the polynomial as indicated by the current secret key digit ($s_j$) and the corresponding masking value ($a_j$; $\tilde{a}_j$), said iteration comprising one external product with an encrypted multiplier polynomial $[\![P_j$ $]\!]$ to further blind rotate the polynomial, the encrypted multiplier polynomial being computed from the bootstrapping keys (bsk), the masking values ($a_j$; $\tilde{a}_j$), and the multiple possible values (A(i)) for the current secret key digit ($s_j$).

2. A computing system for fully homomorphic encryption (FHE) comprising a communication interface for receiving encrypted values (231; LWE) and bootstrapping keys, a processor system configured to perform a blind rotation, the blind rotation selectively rotating coefficients of a polynomial ($\overline{v}$(X)) as indicated by an encrypted value, the encrypted value comprising a sequence of masking values ($a_i$; $\tilde{a}_i$) and a masked value (b), the masked value being computable from a plain value, a mask ($\Sigma a_i s_i$) and noise, the mask being computable from a secret key (s) and the sequence of masking values, the secret key (s) comprising a sequence of secret key digits ($s_i$), a digit having one of at least three possible values, multiple bootstrapping keys corresponding to each secret key digit, the multiple bootstrapping keys being an encryption of multiple data items representing the secret key digit, performing the blind rotation comprising:

rotating the polynomial over the masked value (b) and iterating over the secret key digits once (For j=1 to n do; For j=1 to n/d do), an iteration further blind rotating the polynomial as indicated by the current secret key digit ($s_j$) and the corresponding masking value ($a_j$; $\tilde{a}_j$), said iteration comprising one external product with an encrypted multiplier polynomial $[\![P_j]\!]$ to further blind rotate the polynomial, the encrypted multiplier polynomial being computed from the bootstrapping keys (bsk), the masking values ($a_j$; $\tilde{a}_j$), and the multiple possible values (A(i)) for the current secret key digit ($s_j$).

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A computer-implemented method for privacy-preserving outsourced computation using fully homomorphic encryption (FHE), the method comprising:

receiving, via a communication interface, an encrypted value and bootstrapping keys from an external computer, performing the outsourced computation obtaining computation results in an encrypted format, the outsourced computation comprising a blind rotation, the blind rotation selectively rotating coefficients of a polynomial (210; $\overline{v}$(X)) as indicated by the encrypted value, the encrypted value comprising a sequence of masking values ($a_i$; $\tilde{a}_i$) and a masked value (b), the masked value being computable from a plain value, a mask ($\Sigma a_i s_i$) and noise, the mask being computable from a secret key (s) and the sequence of masking values, the secret key (s) comprising a sequence of secret key digits ($s_i$) corresponding to the sequence of masking values, a secret key digit having one of at least three possible values, multiple bootstrapping keys corresponding to each secret key digit, the multiple bootstrapping keys being an encryption of multiple data items representing the secret key digit, performing the blind rotation comprising:

rotating the polynomial over the masked value (b) and iterating over the secret key digits once, an iteration further blind rotating the polynomial as indicated by the current secret key digit ($s_j$) and the corresponding masking value ($a_j$; $\tilde{a}_j$), said iteration comprising one external product with an encrypted multiplier polynomial $[\![P_j]\!]$ to rotate an encrypted accumulator, the encrypted multiplier polynomial being computed from the bootstrapping keys (bsk), the masking values ($a_j$; $ã_j$), and the at least three possible values (A(i)) for the current secret key digit ($s_j$), the method comprising computing the encrypted multiplier polynomial, said computing comprising:

computing multiple possible plain multiplier polynomials ($P_j$(X)) for multiple possible values (A(i)) of the current secret key digit ($s_j$), computing the encrypted multiplier polynomial from the multiple possible plain multiplier polynomials and corresponding multiple bootstrapping keys, and transmitting the computation results to the external computer in the encrypted format, via the communication interface.

2. A method as in claim 1, wherein the encrypted multiplier polynomial represents an encryption of a plain polynomial ($P_j$(X)) comprising a monomial ($X^d$), wherein the exponent of the monomial is the amount of further rotation indicated by the current secret key digit ($s_j$) and the corresponding masking value ($a_j$; $ã_j$).

3. A method as in claim 1, wherein the encrypted multiplier polynomial ($[\![P_j(X)]\!]$) represents an encryption of a plain polynomial of the form $X^d$–$X^e$, $X^d$–1 or $X^d$.

4. A method as in claim 1, comprising computing the encrypted multiplier polynomial, said computing comprising:

computing multiple possible plain multiplier polynomials ($P_j$(X)) for multiple possible values (A(i)) of the current secret key digit ($s_j$), and computing the encrypted multiplier polynomial from the multiple possible plain multiplier polynomials and corresponding multiple bootstrapping keys.

5. A method as in claim 4, wherein computing the encrypted multiplier polynomial comprises computing a dot product of a sequence of bootstrapping keys and a sequence of plain polynomials (($X^{A(i)ã_j}$–1); ($X^{A(i)ã_j}$–$X^{A(0)ã_j}$); $X^{A(i)ã_j}$) for multiple possible values (A(i)) of the current secret key digit.

6. A method as in claim 1, wherein the encrypted value is an LWE or GLWE encryption, and/or the encrypted multiplier polynomial is a GGSW encryption, and/or the bootstrapping keys are GGSW encryptions, and/or the blind rotated polynomial is a GLWE encryption.

7. A method as in claim 1, wherein the masked value (b) is discretized ($\bar{b}$) before rotating the polynomial over the masked value, and/or the masking value ($a_j$) is discretized ($ã_j$) before further rotating the polynomial.

8. A method as in claim 1, wherein an accumulator (ACC) is initiated (($ACC \leftarrow (0, \ldots, 0, X^{-b} \cdot \overline{v}$) with the polynomial ($\overline{v}$) rotated over the masked value, an iteration further blind rotating the accumulator indicated by the current secret key digit ($s_j$) and the corresponding masking value ($a_j$; $ã_j$).

9. A method as in claim 1, wherein a bootstrapping key encrypts a binary value indicating whether the secret key digit ($s_j$) has a value corresponding to the bootstrapping key.

10. A method as in claim 1, wherein the number of bootstrapping keys for a secret key digit is one less than the number of possible values of the secret key digit.

11. A method as in claim 9, wherein one particular possible value of a secret key digit does not correspond to one particular bootstrapping key, whereas each of the other possible values of the secret key digit are each indicated by a particular bootstrapping key, the one particular possible value being indicated by the bootstrapping keys not indicating any of the remaining values.

12. A method of performing a bootstrapping operation, said bootstrapping operation comprising:

a blind rotation with a test polynomial, wherein the blind rotation is performed according to the method of claim 1, wherein the test polynomial comprises a sum of monomials, an exponent of a monomial indicating an input value of the bootstrapping operation, a coefficient of the monomial indicating an output of the bootstrapping operation, the blind rotation causing the monomial indicating the output to be rotated to a fixed position.

13. A method as in claim 12, wherein output values of the bootstrapping operation have a reduced noise level, and/or output values of the bootstrapping operation are outputs of a further function applied to the encrypted value.

14. A method as in claim 1, wherein each iteration corresponds to exactly one secret key digit, or each iteration corresponds to multiple secret key digits.

15. A non-transitory computer readable medium comprising data representing instructions, which when executed by a processor system, cause the processor system to perform the method according to claim 1.

16. A computing system for privacy-preserving outsourced computation using fully homomorphic encryption (FHE), the computing system comprising a communication interface for receiving an encrypted value and bootstrapping keys from an external computer, a processor system configured to perform the outsourced computation obtaining computation results in an encrypted format, the outsourced computation comprising a blind rotation, the blind rotation selectively rotating coefficients of a polynomial (210; $\overline{v}$ (X)) as indicated by the encrypted value, the encrypted value comprising a sequence of masking values ($a_i$; $ã_i$) and a masked value (b), the masked value being computable from a plain value, a mask ($\Sigma a_i s_i$) and noise, the mask being computable from a secret key (s) and the sequence of masking values, the secret key (s) comprising a sequence of secret key digits ($s_i$) corresponding to the sequence of masking values, a secret key digit having one of at least three possible values, multiple bootstrapping keys corresponding to each secret key digit, the multiple bootstrapping keys being an encryption of multiple data items representing the secret key digit, performing the blind rotation comprising:

rotate the polynomial over the masked value (b) and iterating over the secret key digits once, an iteration further blind rotating the polynomial as indicated by the current secret key digit ($s_j$) and the corresponding masking value ($a_j$; $ã_j$), said iteration comprising one external product with an encrypted multiplier polynomial $[\![P_j]\!]$ to rotate an encrypted accumulator, the encrypted multiplier polynomial being computed from the bootstrapping keys (bsk), the masking values ($a_j$; $ã_j$), and the at least three possible values (A(i)) for the current secret key digit ($s_j$), the processor system being configured to compute the encrypted multiplier polynomial, said computing comprising compute multiple possible plain multiplier polynomials ($P_j(X)$) for multiple possible values ($A(i)$) of the current secret key digit ($s_j$), compute the encrypted multiplier polynomial from the multiple possible plain multiplier polynomials and corresponding multiple bootstrapping keys, and transmit the computation results to the external computer in the encrypted format, via the communication interface.

* * * * *